United States Patent [19]
Parsadayan

[11] Patent Number: 5,869,940
[45] Date of Patent: Feb. 9, 1999

[54] GATE OPERATOR APPARATUS AND METHOD WITH LEARNING-MODE

[75] Inventor: Walter Parsadayan, Lake Forest, Calif.

[73] Assignee: Elite Access Systems, Inc., Lake Forest, Calif.

[21] Appl. No.: 859,879

[22] Filed: May 21, 1997

[51] Int. Cl.$^6$ ..................................................... G05B 5/00
[52] U.S. Cl. ................... 318/461; 318/466; 318/568.14; 49/138
[58] Field of Search ...................... 318/568.14, 280–286, 318/461–470; 49/26–30, 138, 139

[56] References Cited

U.S. PATENT DOCUMENTS

| | | | |
|---|---|---|---|
| 4,150,937 | 4/1979 | Pelagio et al. | 425/464 |
| 4,234,833 | 11/1980 | Barrett | 318/282 |
| 4,367,532 | 1/1983 | Crum et al. | 364/513 |
| 4,429,264 | 1/1984 | Richmond | 318/466 |
| 4,498,003 | 2/1985 | Cibis | 250/223 B |
| 4,564,791 | 1/1986 | Brickner | 318/16 |
| 4,603,284 | 7/1986 | Perzley | 318/568.14 |
| 4,831,509 | 5/1989 | Jones et al. | 364/167.01 |
| 4,916,860 | 4/1990 | Richmond et al. | 49/28 |
| 5,076,012 | 12/1991 | Richmond et al. | 49/28 |
| 5,136,809 | 8/1992 | Richmond et al. | 49/28 |
| 5,230,179 | 7/1993 | Richmond et al. | 49/28 |
| 5,278,480 | 1/1994 | Murray | 318/626 |

*Primary Examiner*—Brian Sircus
*Attorney, Agent, or Firm*—Oppenheimer Wolff & Donnelly LLP

[57] ABSTRACT

A powered gate operator includes an electric motor coupled by a drive train to a movable gate in order to drive the gate between opened and closed positions. The gate may also be moved manually between these opened and closed positions, or may be moved by powered operation of the gate operator under manual input control of velocity and acceleration of the gate. The gate operator includes a control system with a learning mode allowing a human to move the gate either manually or under powered operation with manual control, and during which the control system learns desired accelerations, deceleration's, pauses, etc., along with start and finish positions for the gate movement in each direction of movement for the gate between opened and closed positions. Thereafter, during powered operation of the gate by the operator the desired movement profile taught by a human to the operator during a learning mode experience is replicated. In the event that no preferred gate movement profile is available to the gate operator from a learning mode experience, it uses a default gate movement profile. Various default profiles of gate movement may be stored in memory and may be selected by an owner of the gate.

21 Claims, 15 Drawing Sheets

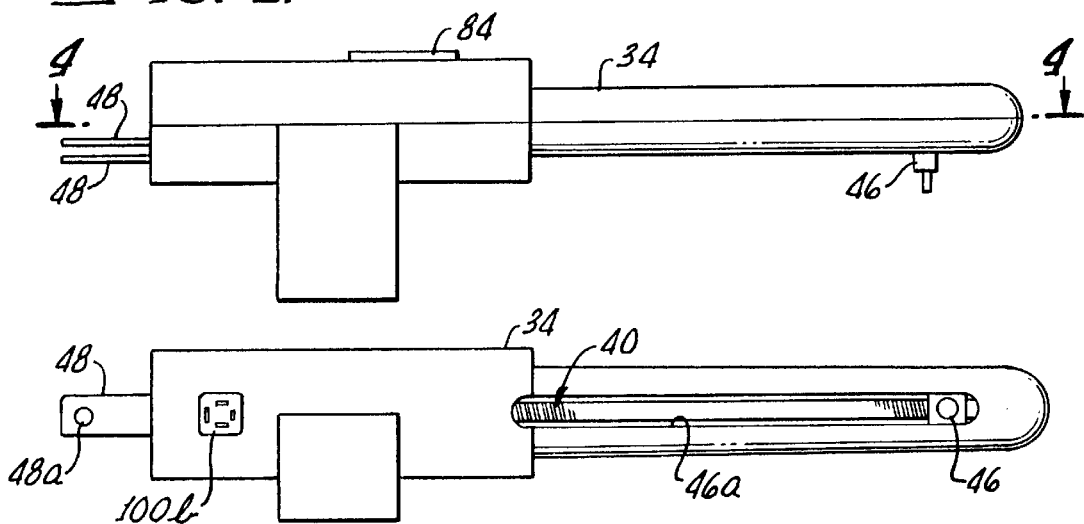
Fig. 2.
Fig. 3.
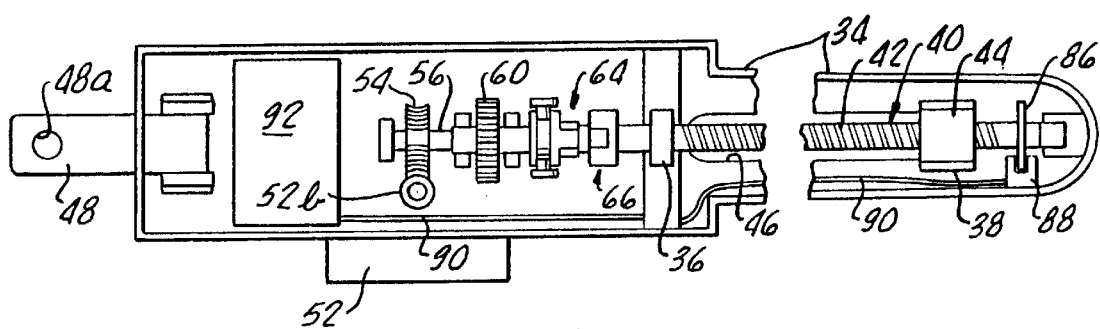
Fig. 4.

GATE OPERATOR APPARATUS AND METHOD WITH LEARNING-MODE

BACKGROUND OF THE INVENTION

1. Field of the Invention

The present invention is in the field of method and apparatus for power-operation of a gate. More particularly, the present invention relates to a power-drive apparatus for selectively moving a gate between opened and closed positions, and which has a mode of operation in which a human may manually teach the gate operator both a fully opened and fully closed position for the gate, as well as a desired profile of accelerations, decelerations, and velocities for the gate as it moves between these fully opened and fully closed positions.

2. Related Technology

It is conventional to move a gate, such as a gate controlling vehicular access to a parking lot, to a gated community, or to private land, for example, by means of a power-drive unit which moves the gate between fully opened and fully closed positions. The gate may swing about a vertical hinge axis to open and close, or may move horizontally along a guide way. Ordinarily, the power-drive unit for such gates includes an electric motor with a speed reduction drive train coupled to the gate to effect its movement between the opened and closed positions.

Conventionally, the limits of movement of a gate are set using conventional limit switches. Alternatively, the mechanism of the gate operator may be configured such that opened and closed position for the gate are set by the mechanical operation constraints of the mechanism itself. That is, a physical abutment or gate movement stop may be used to set the limits of movement of the gate at one or both of the fully opened and fully closed positions. When the gate encounters the physical stops, the drive motor stalls, the stalled motor draws an increased level of current, and a current sensing circuit associated with the drive motor senses this stall-current and shuts off the drive motor. Alternatively, an encoder providing a pulse train indicative of gate movement may be used. In this case, when the gate encounters a physical movement stop, the pulse train also stops, and the end of this pulse train can be sensed by, for example, using a time-out timer to detect when the interval between pulses exceeds a certain threshold. In this case, a controller for the gate will determine the locations of the physical gate movement stops in terms of pulse count numbers, and use this information in future operations of the gate.

Owners of gate operators which depend upon contact of the gate with a physical gate movement stop will likely object to the jarring and noise such impact produces. Many owners are quite unhappy with the conventional gate operator mechanisms because the gate literally bangs or slams against the stops with each operation of the gate between opened and closed positions. Even the gate operators which reset the positions of the limit stops and use an encoder will hang against the stops on the first operations of the gate, or after a system reset.

Conventional power-drive gate operators are seen in U.S. Pat. Nos. 4,234,833; 4,429,264; 4,916,860; 5,136,809; and 5,230,179. Of these conventional teachings, the '833 patent purports to disclose a gate operator with a form of motor shaft rotation encoder formed by flats on the drive motor shaft, which flats are viewed by an optical sensor. The sensor generates an output signal indicative of gate movement as represented by rotation of the drive motor shaft. Apparently, the owner of this device must determine the extent of gate movement between its fully opened and fully closed positions, and program this movement information into the gate operator in the form of an encoder pulse count number.

The '860, '809, and '179 patents are related to one another and appear to use a form of encoder employing magnetic sensors mounted to a stationary plate member and cooperative magnets mounted to a pulley rotating with an output shaft of the gate operator. The drive shaft of the motor for this device appears to be connected to the gate at all times. This device does not appear to have a self-teaching function.

The '264 patent appears to relate to a gate operator which employs an encoder to determine gate movement between its fully opened and fully closed positions, and which does not employ any limit switches. This gate operator appears also not to have a teaching mode. In this gate operator, the gate is initially driven against its physical stops in order to stall the motor of the gate operator and to allow the control system for this gate operator to set beginning and end values for a full-travel pulse count register entry. Thereafter, the gate operator counts encoder pulses as the gate moves between its fully opened and fully closed positions, counting pulses up in each direction of gate movement until the pulse count matches the value in the full-travel register. This gate operator does not appear to have any provision for easing into contact with physical stops, or for easing through a potential obstruction contact zone at a reduced speed so that contacts with physical objects (i.e., with the physical stops or an obstruction) are not at full gate speed. The gate of this '264 patent thus may crash against the physical stops or an obstruction, and may even "bounce off" such objects, as the patent explains.

None of the gate operators in the related technology allow a human to simply teach the gate operator where the physical stops of gate movement are located, to show the gate operator where selected limits (limit positions, not physical movement stops) of gate movement are located for fully open and fully closed positions, or to show the gate operator the speed of movement desired for the gate, or the locations and magnitudes of accelerations and decelerations desired for the gate by manually moving the gate between these positions and at velocities and accelerations which are the human's choice to be replicated by the gate operator. Also, none of the convention gate operators appear to provide for an alternative mode of learning for such an operator in which a human who perhaps is too frail to physically move the gate in a preferred velocity and acceleration profile, or who simply doesn't want to have to physically move the gate to teach the operator a desired profile, can instead use a manual input device to the gate operator so that in a learning mode the gate is power driven according to a profile input from the manual input device, and the gate operator learns this profile for future use. Further, none of the conventional gate operators provide for a variety of preprogrammed default gate movement profiles which can be selected by the user in the event that a user-programmed profile is not used.

SUMMARY OF THE INVENTION

In view of the above, it is desirable to provide a gate operator which avoids one or more of the shortcomings of the conventional technology.

More particularly, it is desirable and an object for this invention to provide a gate operator in which a teaching mode is provided.

Further to the above, it is an object of this invention to provide a gate operator in which a teaching mode provides for a human to manually and physically move the gate between its fully opened and fully closed positions, and in which the gate operator records these limit positions for later use in stopping the motion of the gate when it is being moved by the drive motor of the gate operator.

Still further to the above, it is an object of this invention to provide a gate operator in which a teaching mode provides for a human to manually and physically move the gate between its fully opened and fully closed positions, and in which the gate operator records accelerations, decelerations, and velocities applied to the gate during this movement, so that these are replicated by the gate operator when it is moving the gate.

Accordingly, the present invention in one aspect provides a powered gate operator for moving a gate, and allowing a human by manual movement of the gate to teach the gate operator a preferred gate movement profile; thereafter the gate operator replicating the preferred gate movement profile by powered movement of the gate, the gate operator comprising: a variable-speed electric motor; a speed reduction power train coupling the electric motor to a movable output member, which output member may be coupled to the gate to effect movement of the gate; an encoder drivingly associated with the output member for providing a signal indicative of the extent of movement of the output member, so that the signal is indicative also of the extent of movement of the gate; a microprocessor-based control system including a time keeping facility and a memory facility and receiving the signal, the control system including programming for recording in the memory facility values indicative of the gate movement profile during manual movement of the gate, the microprocessor-based control system also including programming for retrieving the values from the memory facility during powered movement of the gate by the gate operator and for controlling the speed of the variable-speed motor according to the values to replicate the gate movement profile.

Alternatively, the present invention in one aspect provides a powered gate operator for moving a gate, and allowing a human to select from among several default profiles stored in programmed memory of the device a preferred default profile to be used by the operator in moving the gate between its opened and closed positions.

According to another aspect, the present invention provides a method of power-operating a gate member movable between opened and closed positions, the method comprising steps of: manually moving a gate member between its opened and closed positions at selected accelerations and velocities; recording a gate movement profile of the selected accelerations and velocities during the manual movement of the gate; and power driving the gate member between its opened and closed positions to replicate the gate movement profile.

A significant advantage of the present invention results from its use of accelerations and decelerations taught to the gate operator by a human teacher during the teach mode of operation. During this teach mode, the human will either move the gate in one direction and then the other between its opened and closed positions manually or by use of the power drive mechanism of the gate operator with a manual input device allowing the human to control the velocities and accelerations selected. During this teach mode the human applies accelerations and velocities to the gate according to the human's choices and judgment. For example, the human teacher may anticipate that the gate during closing may someday contact a vehicle stopped in the path of the gate within a particular zone in the gate's closing movement. Anticipating this possible future encounter between the gate and a vehicle, the owner may choose to have the gate slow down as it approaches this zone, and to pass through the zone where contact with a vehicle may take place at a slower speed. After this zone is traversed by the gate, the owner will likely want the gate to accelerate to a more brisk closing speed, and to maintain this speed until the fully closed position is approached. As the gate approaches its fully closed position, the owner may want the gate to decelerate, and then stop gently without impacting against the gate stop.

Another variation of gate operation may be envisioned in which the owner of a pedestrian gate desires that the gate move rather quickly from its fully closed position in the opening direction to allow quickly moving pedestrians (and bicycle riders, for example) to move through the gate without having to wait unduly for the gate to open wide enough. Once this quick opening phase of movement is completed by the gate, however, it is desirable for the gate to slow down and approach its fully opened position at a slower speed. The gate owner may then want the gate to "ease into" its fully opened position so that impacts of the gate with a physical stop and resulting noises are avoided.

Further to the above, an additional advantage of the present invention which will be appreciated in view of the following description of a particularly preferred exemplary embodiment is that a gate and gate operator may be arranged without physical stops. In such a case, the gate operator will operate the gate between pre-selected fully opened and fully closed positions, and no possibility exists for the gate to bang into physical stops and make undesirable noise.

In each case, with the present invention, the owner need only teach the gate operator how the movement of the gate is to be carried out by moving the gate as desired while the gate operator is in its "learning" mode. This "leaning mode" movement of the gate can be effected either manually or by use of a manual input device causing the gate operator to move the gate at velocities and with accelerations as selected by the user. Thereafter, the gate operator will replicate the gate movements desired by the gate owner. That is, all of these variations of gate acceleration and velocity in the gate's operation can be accomplished by the owner simply applying the velocities and accelerations to the gate that are desired during a "learning mode" physical movement of the gate. The locations for the fully opened and fully closed positions of the gate are learned during this mode, and can be adjacent to physical stops, for example, or without physical stops simply in positions selected by the human teaching the gate operator where the gate is to be stopped. During power operation, the gate operator will reproduce the desired accelerations and velocities for the gate within its physical limitations. Fully opened and fully closed positions for the gate will also be replicated with good precision.

A better understanding of the present invention will be obtained from reading the following description of a single preferred exemplary embodiment of the present invention when taken in conjunction with the appended drawing Figures, in which the same features (or features analogous in structure or function) are indicated with the same reference numeral throughout the several views. It will be understood that the appended drawing Figures and description here following relate only to one or more exemplary preferred embodiments of the invention, and as such, are not to be taken as implying a limitation on the invention. No such limitation on the invention is implied, and none is to be inferred.

BRIEF DESCRIPTION OF THE DRAWING FIGURES

FIG. 1 provides a fragmentary perspective view of a gate operator embodying the present invention moving a "swing" gate between opened and closed positions relative to a gate opening;

FIG. 1a provides an enlarged perspective view of the gate operator seen in FIG. 1;

FIGS. 2 and 3 are respective elevation and bottom side views of the gate operator seen in FIGS. 1 and 1a;

FIG. 4 provides a longitudinal cross sectional view taken through the gate operator seen in FIGS. 1–3, and generally at the plane indicated by arrows 4—4 on FIG. 2;

FIG. 5 provides a longitudinal view, partially in cross section, of a portion of the gate operator seen in FIGS. 1–4;

FIG. 6 is a schematic representation of a programmable-logic control circuit of a gate operator embodying the present invention;

FIGS. 7a and 7b respectively provide a pulse signal-level-versus-time diagram and a state diagram for encoder pulses provided by an element of the gate operator and used in a control circuit as seen in FIG. 6;

FIGS. 8, 9, and 10 are respective flow charts for programming of the programmable-logic control circuit seen in FIG. 6; and FIGS. 11–17 are respective graphical presentations illustrative of principles or examples of data collection and data utilization carried out by the programmable-logic control circuit of FIG. 6 in operation of the gate operator.

DETAILED DESCRIPTION OF EXEMPLARY PREFERRED EMBODIMENTS OF THE INVENTION

Figure 1:
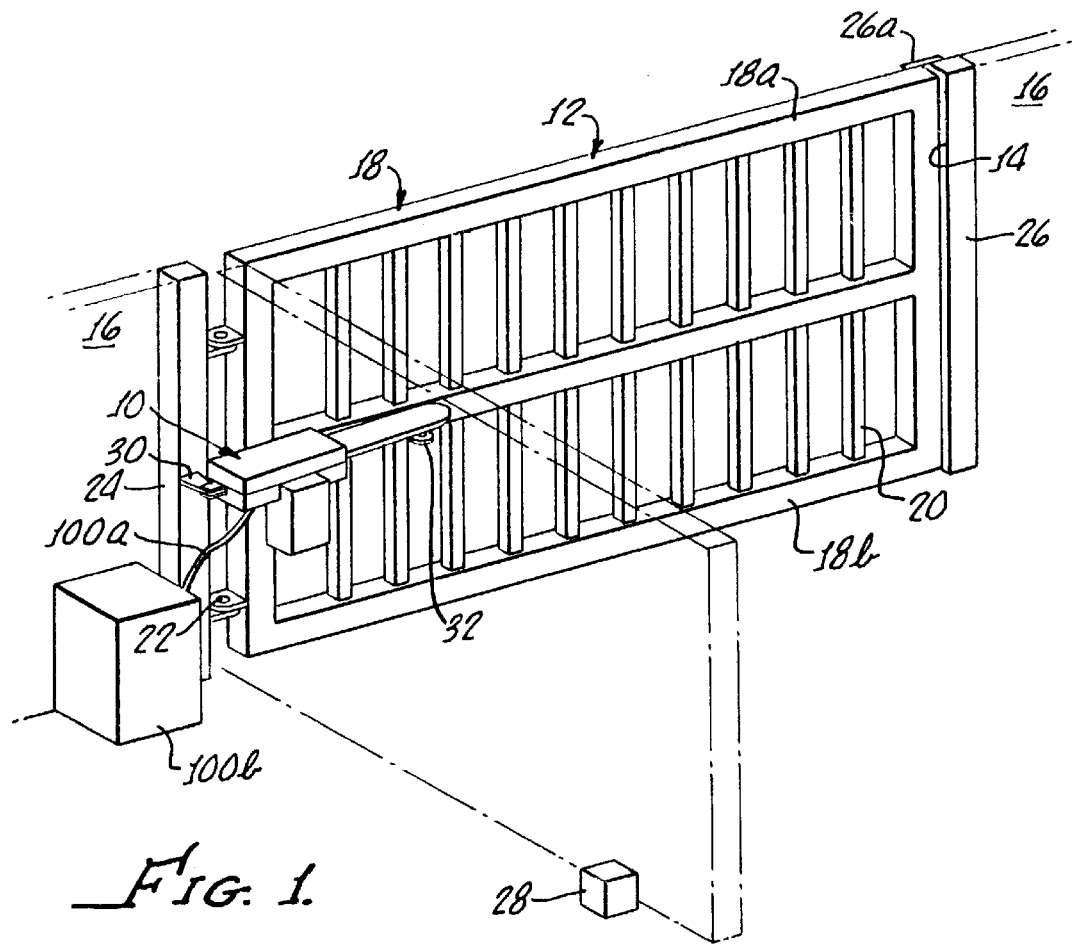

Viewing FIG. 1, a gate operator 10 is connected to a gate 12 to move the gate between opened and closed positions with respect to a gate way 14 in a wall or fence 16. The gate 12 is of "swing gate" style, although the present invention in other embodiments can be used with gates of other configurations. More particularly, the gate 12 includes a gate frame 18 having a plurality of vertical bars 20 extending between upper and lower horizontal portions 18a and 18b of the frame 18. At one side, the gate is supported by hinges 22, which are secured to a vertical support portion (or post) 24, at the gate way 14. In order to establish physical limits of swinging movement for the gate 12 between its fully opened and fully closed positions, the gate way 14 includes also another vertical gateway portion (or post) 26 which carries an abutment or stop member 26a contacted by the gate in its fully closed position. Conversely, a stop is also usually provided for the gate in its fully opened position. In this case, a post 28 is provided against which the gate 12 will contact to limit its position in its fully opened position. However, as will be seen, physical stops need not be provided at the locations of posts 26 and 28.

Figure 1A:
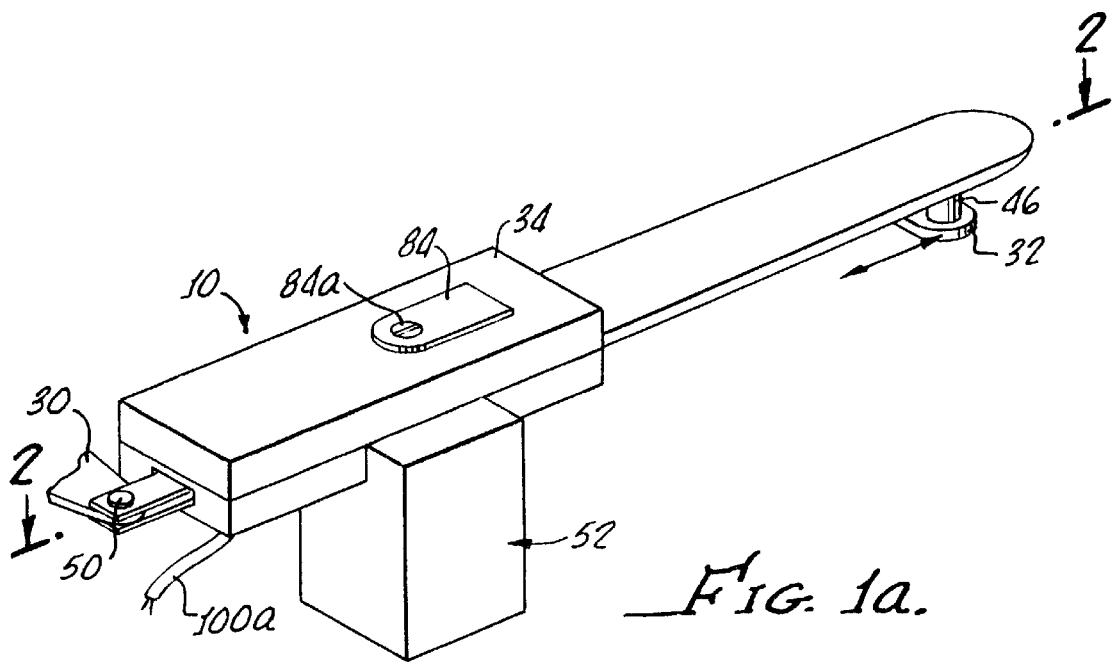

In order to mount and provide operative connection of the operator 10 to the gate 12, the post 24 carries a projecting bracket 30, to which one end of the operator 10 is pivotally connected, considering now both FIGS. 1 and 1a. Another bracket 32 is carried by the gate 12, and also projects from this gate horizontally. A relatively movable portion of the operator 10 is pivotally connected to this bracket 32, as will be further described. Consequently, in overview, it will be understood that the operator 10 is spaced sufficiently from the hinges 22 at post 26 and from gate 12 to exert an opening or closing torque on the gate in response to contraction and elongation, respectively, of the operator 10.

FIGS. 2 and 3 provide respective side elevation and bottom side views of the operator 10, while FIG. 4 provides a longitudinal cross sectional plan view of the operator 10 taken generally along line 4—4 of FIG. 2. Viewing FIGS. 2–4 in conjunction with one another it is seen that the operator 10 includes an elongate housing portion 34. Housing portion 34 supports a pair of radial bearings 36, 38, at least one of which is also a thrust bearing, and together journaling an elongate jack screw member 40. The jack screw 40 has a multi-start thread portion 42 extending between the bearings 36, 38, and a nut member 44 is threadably carried on this portion 42 of the jack screw member 40. Projecting from the nut member 44 is an elongate pin portion 46, which projects downwardly though an elongate slot 46a of the housing 34, and is captively received pivotally in a corresponding hole (not illustrated in the drawing Figures) in bracket 32 in order to pivotally connect the operator 10 to the gate 12. The housing portion 34 includes a projecting portion 48 which is generally configured as a device inkling a pair of spaced apart arms 48a, each defining an aligned through hole 48b. A pin member 50 extends through the holes 48b of the portion 48, and is pivotally received captively into a corresponding hole (not seen in the drawing Figures) of the bracket 30 in order to pivotally connect the operator 10 at its housing portion 34 to the bracket 30 at post 24.

Viewing the jack screw 40, it is seen that the thread portion 42 has a multi-start thread, as was mentioned above. This thread has a pitch angle sufficiently high or "fast" that a sufficient axial force applied to nut member 44 will move this nut member along the jack screw 40, rotating the jack screw if this jack screw 40 is not constrained against rotation. In other words, and in contrast to the usual bolt thread or jack screw thread, the thread on jack screw 40 is provided with a sufficiently high pitch angle that a "back driving" relationship is possible between axial force applied to nut member 44 and rotation of the jack screw 40. The pitch angle of the tread on jack screw 30 is selected to be sufficiently high that manual force applied to gate 12 will effect movement of the gate and back driving of nut 44 along thread 42, unless the jack screw 40 is constrained against this back driving rotation.

Of course, the converse is also true. When the jack screw 40 is power-driven in rotation, the nut member 44 will be moved along this screw thread 44 because the connection of the nut member 44 to the gate 12 prevents its rotating with the jack screw 40. This power-driving of the nut member 44 thus will be understood to be effective to cause movement of the gate 12. In order to effect selective powered rotation of the jack screw 42, it will be seen in overview that also carried in the housing 34 is a variable speed reversible drive motor, a gear reduction power train of no-back nature extending from the motor to the worm gear shaft 40, and a releasable clutch mechanism interposed in the gear reduction portion of the power train. The drive motor in this case is in the form of a variable-speed reversible motor 52 having a motor shaft 52a with an end portion 52b formed to incorporate an integral worm gear.

Figure 5:
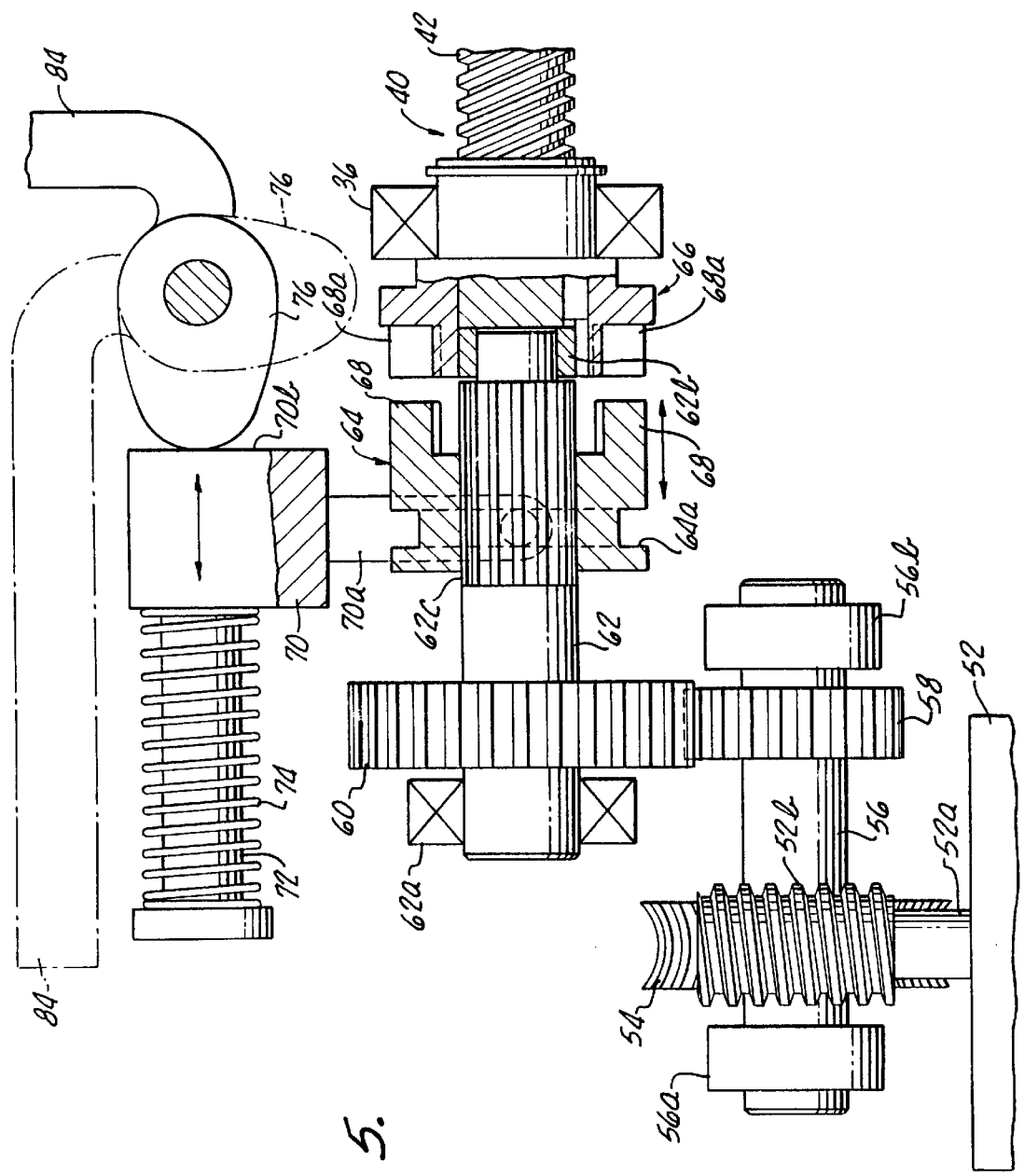

The worm gear portion 52b of motor shaft 52a meshes with a worm wheel 54, forming a "no back" drive relationship with the motor 52. Worm wheel 54 is carried by a shaft 56 which is journaled by a pair of bearings 56a, 56b supported in housing 34, and which drivingly carries a pinion gear 58. Pinion gear 58 meshes with a spur gear 60 drivingly carried on a shaft 62, which is journaled by a bearing 62a and by a bushing 62b, best seen in FIG. 5. This shaft 62 also defines a spline section 62c drivingly carrying an axially movable element 64 of a dog clutch assembly collectively referenced with the numerals 64 and 66. The axially fixed element of this dog clutch assembly is indicated with numeral 66, and is carried by the jack screw shaft 40. This axially fixed element of the dog clutch assembly 64, 66, carries the bushing 62b.

The dog clutch assembly 64, 66 may employ a variety of engagement dog features. The illustrated engagement dogs 68, are of sector-shape, are carried by clutch element 64, and are drivingly received into sector-shaped recesses 68a of the clutch element 66. In order to allow engagement and disengaging axial movements of the element 64, this element defines a circumferential groove 64a, into which is received a yoke end 70a of a shift fork member 70. The shift fork member 70 is carried by an axially movable shift rod 72, movably carried in the housing 34. A coil spring 74 extends along the rod 72 between the shift fork 70 and the housing 34 in order to yieldably bias the rod 72 and shift fork 70 axially toward a position of engagement for clutch assembly 64, 66.

Aligned with the shift fork 70 at an axially disposed surface 70b thereof is a cam member 76 pivotally carried by the housing 34. This cam member 76 in this case is formed on the inner end of a pivotal handle 84, which is both carried by and outwardly accessible on the housing 34 (best seen in FIG. 1a). It will be understood that provision is made by use of a lock 84a to lock the handle portion 84 in its solid line position seen in FIG. 1a.

In the position of the handle member 84 seen in solid lines FIG. 1a, and in dashed lines in FIG. 4, the cam member 82 confronts but does not engage the end surface portion 70a of shift fork 70. The spring 74 thus maintains the shift fork 70 and the movable element 66 of the clutch assembly 66, 68 in a position of engagement for the dog clutch, as is seen in FIG. 4. It will be understood that when handle portion 84 is pivoted to the solid line position seen in FIG. 5, then the shift rod 72 and shift fork 70 along with clutch element 64 are all moved leftwardly viewing this drawing Figure from their illustrated engaged position of FIG. 4 and to the position of disengagement seen in FIG. 5, in which the dogs 68 are removed from recesses 68a. The clutch element 66 slides drivingly along the spline portion 62c in order to disengage (and also to engage) the clutch 64, 66. In this disengaged relative position for the clutch elements 64, 66, the "no back" relationship of the worm wheel 54 and worm gear portion of motor shaft 52a no longer prevents back driving of the jack screw 40 by manual force applied to the gate 12.

In view of the above, it is easily understood that the gate 12 can not be manually moved between its opened and closed positions so long as the handle 84 is in its solid-line position seen in FIGS. 1–4. This no-back relationship between movement of the gate and movement of the operator 10 prevents the gate 12 from being manually forced opened from its closed position, for example, by an unauthorized intruder. On the other hand, when motor 52 is operated, the gate 12 will swing between its opened and closed positions by driving power transmitted to jack screw 40 via the worm wheel 54, shaft 56, pinion gear 58, spur gear 60, clutch elements 64, 66, and the thread relationship of nut member 44 on thread section 42 of jack screw 40. Movement of the nut member 44 axially along jack screw 40 effectively changes the distance between the pins 46 and 50, so that the position of the gate 12 in its swing between the opened and closed positions is determined by the spacing between these pins with the housing 34 extending between the brackets 30 and 32.

On the other hand, if a owner of the gate operator 10 lifts handle 84 to a position indicated by dashed lines in the drawing Figures, the cam member 76 engages end surface portion 72a of shift rod 72, and separates the clutch elements 64, 66 by moving the element 64 axially along shaft 62 on the spline portion 62c thereof. In this instance, an opening or closing manual force applied to the gate 12 can cause the nut member 44 to move along jack screw 40, with the jack screw 40 rotating freely in housing 34. The jack screw 40 will rotate clutch element 66, but cannot cause rotation of any other part of the power train leading to motor 52 because the clutch 64, 66 is disengaged. That is also, because the shaft 40 is freed to rotate the no-back relationship between the worm wheel 54 and motor 52 does not prevent the gate 12 from being manually moved.

Having observed the structure and mechanization of the gate operator 10, attention may now be directed to its operation and control, with attention now to FIGS. 1–4, and FIG. 6. As is seen in FIG. 4, the jack screw member 40 carries at its distal end remote from the bevel gears 64 and 66, an apertured code wheel 86. The code wheel 86 has a circumferentially constant array or distribution of apertures or notches 86a. An electro-optical encoder 88 straddles the perimeter of this code wheel 86 so that electrical pulses are provided on wires 90 in response to the rotation of jack screw member 40 as notches 86a come into alignment with the encoder 88. The spacing of the apertures or notches 86a determines the resolution of the encoder 86/88 with respect to rotation of the jack screw 40 and movement of gate 12. This particular form of rotational encoder is illustrative only, and the invention is not limited to use of this or any particular form of encoder. Further, a rotational encoder need not be used. A linear form of encoder may be utilized, and may be responsive to linear movements of the nut member 44, for example. All that is required is that the encoder is responsive to movements of the gate between its opened and closed positions, whether these movements result from manual movements of the gate or power driving of the gate by the operator itself.

Importantly, it will be understood that the jack screw member need not be rotating because of power delivered by motor 52 in order for pulses to appear on wires 90. That is, the rotation of jack screw member 40 may result from manual movement of the gate 12 by the owner of this gate. The wires 90 connect into a programmable-logic control circuit 92, which is located adjacent to and is associated with the motor 52 in this case. It will be understood further, that the control circuit 92 need not be located within housing 34 at all, and may be located at some more remote place outside of the gate operator mechanism itself.

Figure 6:
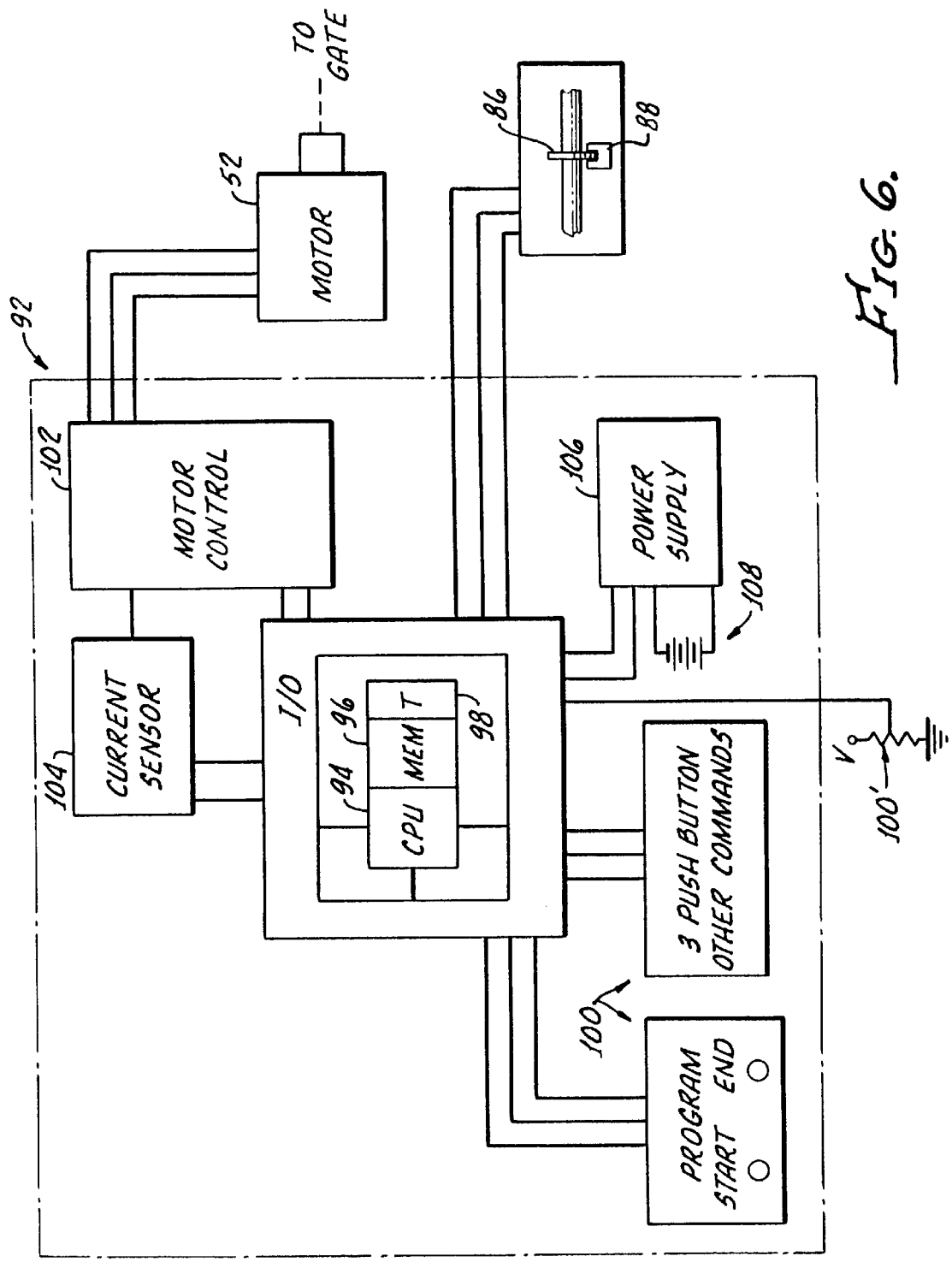

Recalling the description above, FIG. 6 provides a schematic illustration of the architecture of the programmable-logic control circuit 92. Viewing this Figure, it is seen that the control circuit 92 includes a microprocessor 94, with memory 96, and clock unit 98. Associated with the microprocessor 94 is an input/output interface, with inputs being received from the encoder 86/88, as well as from switch-form inputs provided by switches 100 (i.e., contact closure inputs—CCI's). The switches 100 may include operating command switch inputs, such as inputs from momentary contact "open", "close", and "park" switches; or from an "open/close" momentary contact switch. Alternatively, the inputs 100 may include a command from an electronic source, such as from a radio control for the gate operator. Still alternatively, the inputs 100 may include an array of DIP switches which may be used to select from among various default gate movement profiles, as will be further explained below. Understandably, some or all of these switches may be remote from the housing 34 and are then communicated to the gate operator via a cable 100a seen in FIGS. 1 and 1a. The cable 100a connects to an optional housing 100b, which in this instance is illustrated as being disposed on the wall 16 adjacent to the gate operator 10.

Additionally, command inputs (i.e., CCI's) for a "learning" mode of operation are provided. The "learning mode"

of operation may be implemented by providing momentary contact switches for "program start" and "program end". Alternatively, a single program switch which is actuated once to begin a "learning mode" and again to end this mode can be used. Most preferably, these momentary-contact switches are provided in a miniature "pen-point" form housed in a recess (not seen in the drawing Figures) under handle 84. Thus, when the handle 84 is raised to allow manual movement of the gate 12, the switches for "program start" and "program end" are exposed, and may be operated by an owner of the gate by pushing on the switches with a blunt small-diameter stylus. A ball point pen is usually used for this purpose. Alternatively, the learning mode command switches may be disposed in housing 100b, as will be easily understood.

The microprocessor 94 also has interface with the motor 52 via a motor controller circuit 102. A current sensing circuit 104 provides for monitoring of the current drawn by motor 52 so that obstructions can be sensed, as well as sensing of physical gate limit stops in the event that the user has not set positions for the fully opened and fully closed positions. A power supply circuit provides appropriate voltages and currents to operate the microprocessor and associated circuitry from line power, and a back-up battery 108 provides for retention of programming variables in the event of a line-power failure.

Figure 7A:
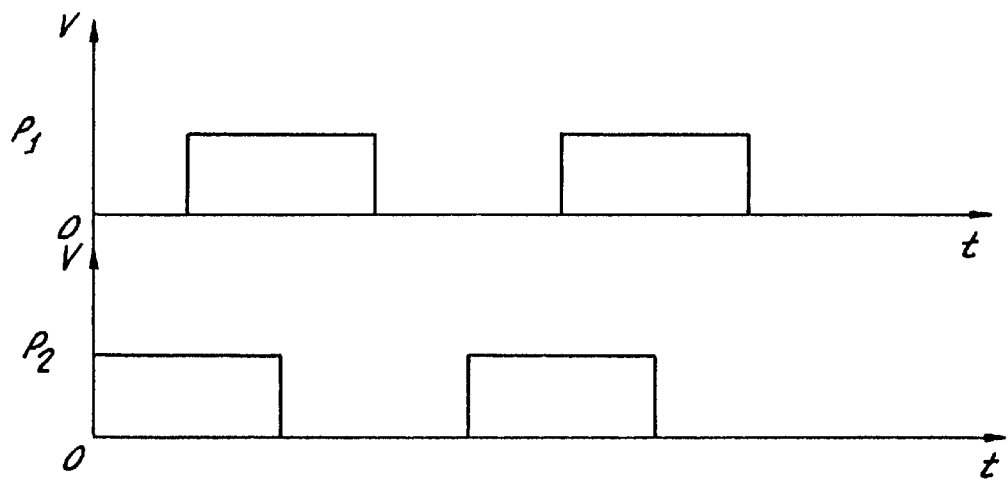
Figure 7B:
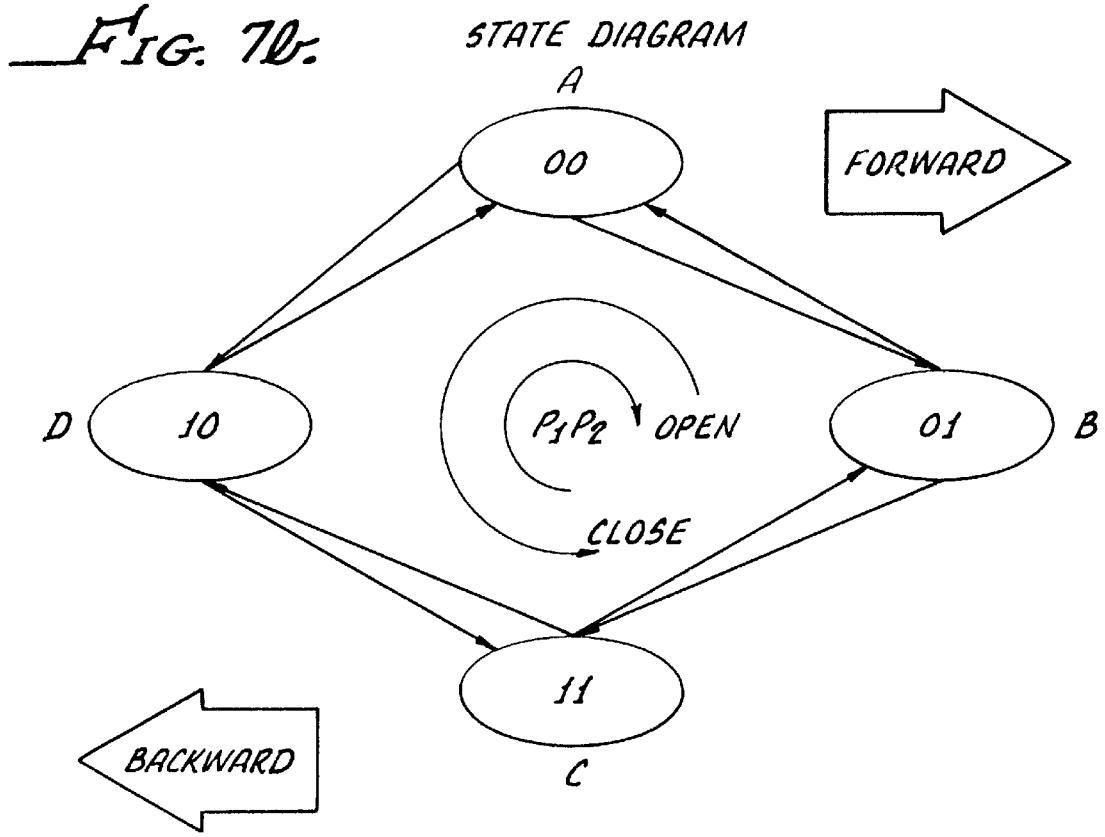

Considering now FIGS. 7a and 7b, a pulse signal-level-versus-time diagram and a state diagram for pulses provided from the encoder 86/88 as the jack screw 40 rotates is presented. As FIG. 7a shows, when the gate 12 is moved, either by operation of the motor 52 or manually be a human owner of the gate, the encoder 86/88 provides two trains of pulses indicating that jack screw member 40 is turning. The pulse trains, indicated as P1 and P2 in FIG. 7a, are off set in time slightly relative to one another (i.e., about one-half of a pulse duration interval). This off set in time of the pulses in trains P1 and P2 allows the microprocessor 94 to determine the direction in which gate 12 is moving, as is indicated by the state diagram of FIG. 7b. Also, it must be remembered that the interval or duration of the pulses in these trains P1 and P2 (and the interval or duration of time between pulses) is variable and is a function of the velocity of movement of the gate 12, and is indicative of the rate of rotation of jack screw 40 and code wheel 86. Viewing FIG. 7b, it is seen that the state diagram indicates clearly and unambiguously which direction of movement for gate 12 is occurring at any time in which the pulse trains of pulses P1 and P2 occur, as is indicated by the arrows on FIG. 7b.

Figure 8:
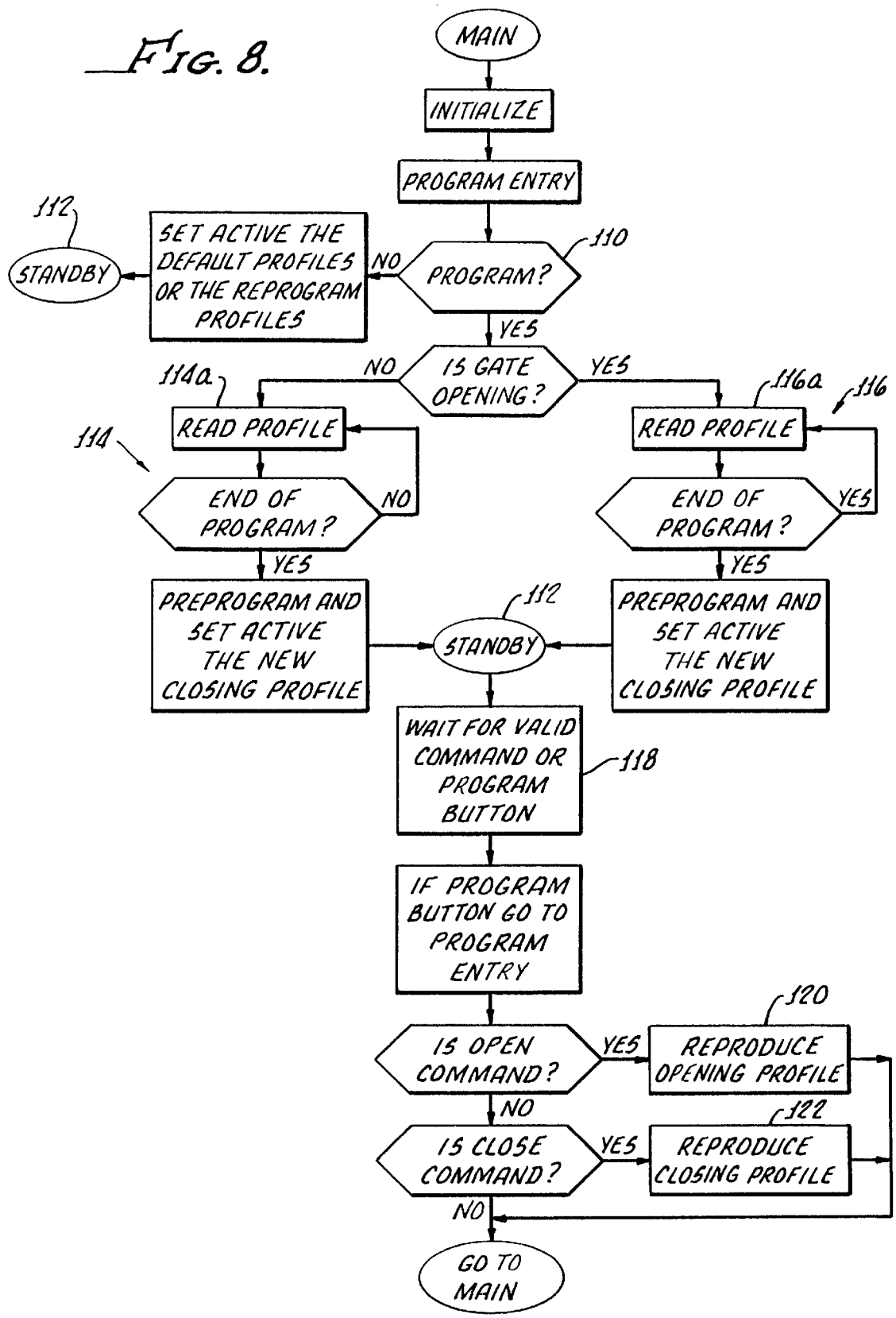

FIG. 8 provides a flow chart for programming of microprocessor 94 both for a gate operating mode of operation and for a "learning mode" of operation. Viewing FIG. 8, it is seen that the microprocessor 94 enters the program when it is "initialized", this means that the program is active when the gate operator is powered up. After initialization, in the event that the line power to the gate operator 10 fails, the programming variables are retained by power supplied by backup battery 108, although a gate operator with an AC motor can not power operate the gate 12 without line power. When line power is restored, the gate operator 10 is operational without additional reprogramming or "relearning" of its program variables. Gate operators with a D.C. motor may still operate the gate while the line power is off provided that sufficient battery power is provided.

Once initialized, the program of microprocessor 94 is either in its learning mode, or in the gate operating mode, as is indicated at decision branch 110. If the owner has pressed the "program start" button (or the program star/stop button, if this is the configuration chose for the I/O switches 100), then the program is caused to enter the "learning mode" of operation. Alternatively, the program may enter the "learning mode" when it first powered up and no leaning mode values have been saved from a previous leaning mode experience. Still alternatively, the program can enter the "leaning mode" at the end of a "reproduce profile" operation, as will be explained.

As pointed out above, the entry into learning mode may vary dependent upon the particulars of the hardware chosen to implement the invention. In the present instance, the I/O level 98 of the control system 92 is provided at switches 100 with two momentary contact switches, one entitled "program start", and the other entitled "program end". Other configurations of owner interfaces with the programming of microprocessor 94 may be provided, as was mentioned above.

Turning to FIG. 8, it is seen that decision branch 110 is dependent upon whether the "program start" switch has been closed. If the "program start" switch has not been closed, then the program (and operator 10) will operate either under default values or under values from a previous programming experience (i.e., from a previous "learning mode"), as will be explained. In this event, the program sets as active either the default values or the previous program variables and stands by, as indicated at program interrupt 112.

In the event that the owner pressed the "program start" switch with the gate 10 in either of its fully opened or fully closed positions (after placing handle 84 in the dashed line position seen in the drawing Figures—thus releasing the gate 10 for manual movement), then the programming illustrated in FIG. 8 will enter one or the other of two program variable-collection branches (i.e., "learning mode" branches for program-variables), respectively indicated with arrowed numerals 114 and 116 on FIG. 8. Each of these branches uses a "read profile" subroutine, indicated with numerals 114a and 116a, respectively, which will be further explained with reference to FIG. 9. If the gate is fully opened and the owner moves the gate manually in "learning mode" toward the closed position, then branch 114 is entered. As the owner moves the gate 12 manually from its fully opened position to its closed position according to the owner's choice of accelerations, velocities, pauses, etc., and to a stop at the fully closed position, the microprocessor 94 will record the values of this movement and record them in memory 96.

Conversely, if the gate 10 is fully closed and is moved manually in "learning mode" toward the opened position, then branch 116 is entered. Again, as the owner moves the gate 12 from its fully closed to its fully opened position according to the owner's preference for the movement profile, the accelerations, velocities, pauses, and position of stopping at the fully opened position is recorded in memory 96. Because the position of full opening may be recorded without reference to a physical stop, the owner may choose to have the full open position slightly short of a real physical stop (such as post 28) so that the gate 10 does not contact this stop upon full opening, and noise of gate operation is decreased. Alternatively, as explained above, physical stops do not need to be provided (or used if they are provided) for the gate 12, and the fully opened and fully closed positions for the gate may simply be "taught" to the gate operator by the owner.

After the owner has programmed one or both of the opening and closing movement profiles for the gate 10 (during which the gate operator also captures the values of pulse count from encoder 86/88 for movement between the fully opened and fully closed positions), the "program end" switch button is pressed, causing the controller 92 to use the program variable values just recorded in future operations of the gate. That is, the program enters the standby program interrupt at 112 again. When a valid operation command for the gate is received by the gate operator, as is indicated at 118 on FIG. 8, then the gate operator 10 will reproduce one of the closing or opening gate movement profiles, using a subroutine as is indicated by program blocks 120 and 122. The subroutines indicated at numbered blocks 120 and 122 are the same, differing only in which of the profiles recorded at blocks 114a and 116a (i.e., the program-variable collection activities explained above) is utilized in order to replicate the opening or closing movement profile for the gate 12. Program subroutine block 120 uses the program variables recorded at 116a, while program subroutine block 122 uses the program variables recorded at program block 114a.

Figure 9:
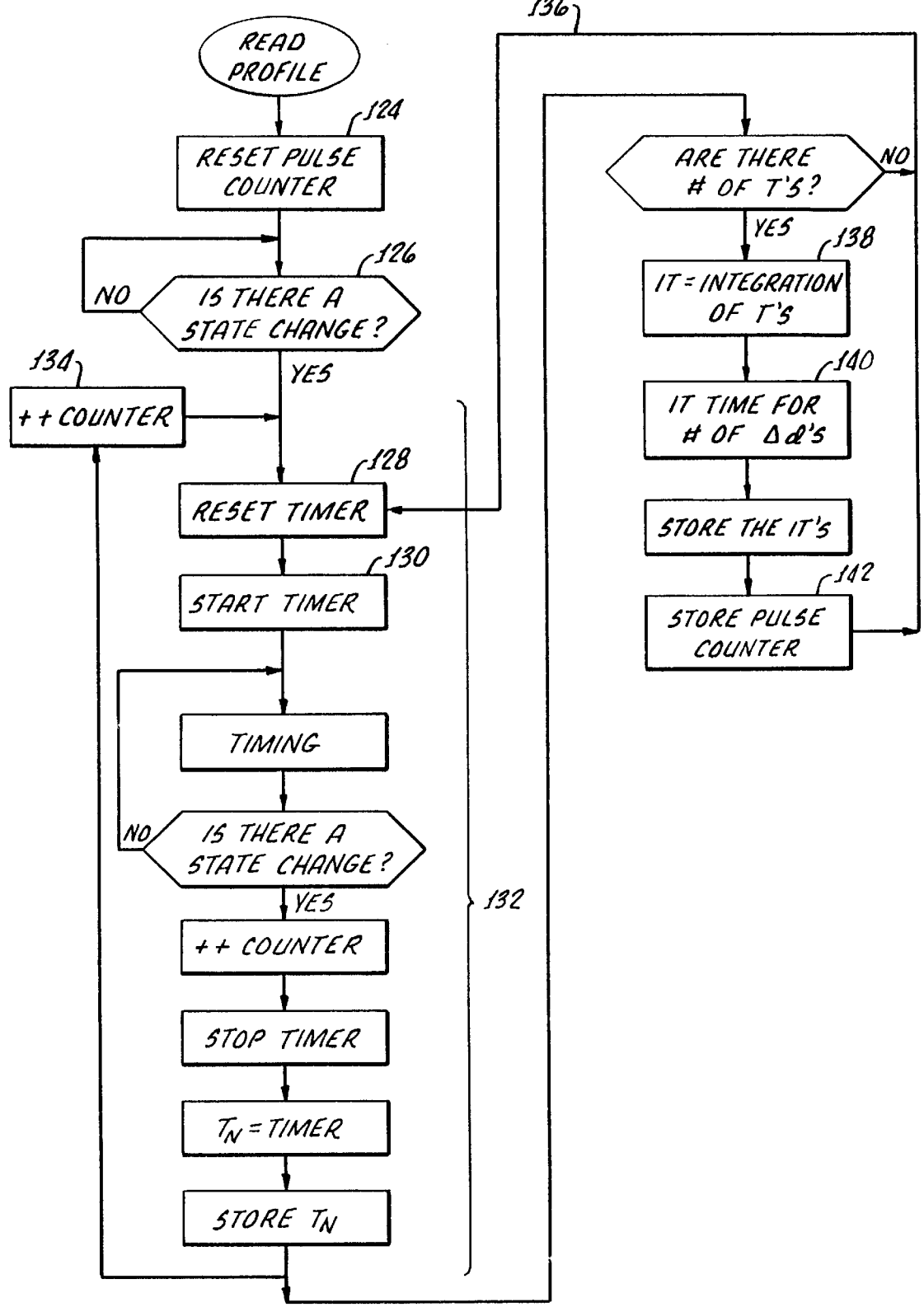

Considering now FIG. 9, the programming of microprocessor 94 to allow it to "learn" the positions, accelerations, and velocities manually produced by a human owner during a "leaning mode" programming experience is set out. This Figure should be considered in combination with the graphical illustrations of FIGS. 11, 12, and 13. Also, it should be kept in mind that relative rotation of the code disk 86 is indicative of and proportionate to movement of the gate 12. As FIGS. 7a and 7b indicate, the time interval for each state (derived from the pulse trains P1 and P2) is variable and is indicative of the velocity of movement of the gate 12. That is, the time interval of each state is inversely proportional to the velocity of the gate through the incremental movement of the gate 12 corresponding to that state.

Viewing FIG. 9, the "read profile" subroutine includes a reset 124 for a pulse count register. Next, the program waits at decision branch 126 until a change in state is detected (i.e., until one of either P1 or P2 changes to its opposite value), indicating that the gate is being moved by the human teacher causing jack screw 40 and encoder disk 86 to rotate. Once movement of the gate 12 is detected by a change in state, the program at 128 resets a timer (which uses clock 98), and starts this timer at 130. Subsequently, as successive states are detected (recalling the state diagram of FIG. 7a), the time interval for each successive state is measured and recorded at 132 as successive variables $\tau_n$, in which the subscript "n" varies from zero to some higher value dependent upon the number of pulses occurring between full open and full closed positions for the gate, and indicates that each successive value of τ has an order or position in a series of such values.

The magnitude of each variable $\tau_n$ is an indication of the velocity of the gate 12 as it moved through a particular incremental movement of travel (Δd, where "d" is displacement of the gate 12) corresponding to each position of the gate for which a particular state exists on the state diagram of FIG. 7b. Because the state diagram is cyclical, there are a great number of such incremental travel movements for the gate between it fully opened and fully closed positions. Next, the program at 134 increments by one a counter for the number "n". If there are a number of state changes, the process continues for successive state changes, as indicated at loop 136.

Next, the program at 138 integrates the $\tau_n$ values, to provide a time interval indicative of total time for the gate 12 to travel in one direction between its fully opened and fully closed positions (named Integral of τ, or Iτ). The travel distance of the gate 12 between these positions is indicated by the number of different states existing between these positions (i.e., the number of different values $\tau_n$ recorded—step 140). This is also equal to the number of incremental movements Δd of the gate 12 between its fully opened and fully closed positions in either direction of movement. The pulse count values (i.e., the number of pulses P1 or P2, or both) between the fully opened and fully closed positions is also recorded at step 142. This pulse count value is generally referred to as "P".

Figure 11:
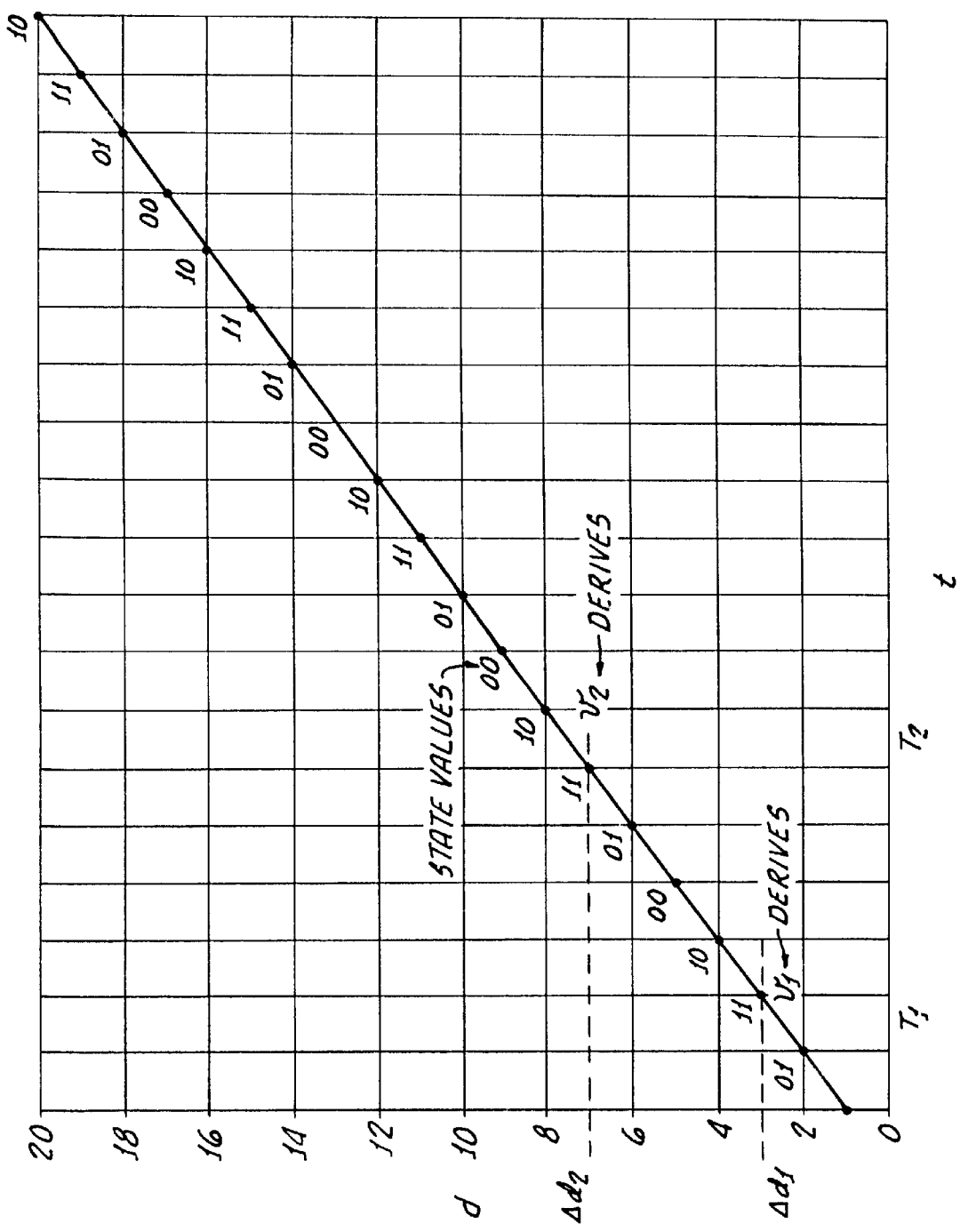

As an aid to understanding the significance of these program steps and operations, FIG. 11 provides an illustrative diagram indicative of constant speed movement for the gate 12 over a particular distance during movement of the gate between its fully opened and fully closed positions. Illustrative state values for the corresponding gate positions are annotated on this graphical presentation. As seen in FIG. 11, the gate position and time for successive state values may be plotted on a coordinate field of Δd versus $\tau_n$, and in this case provides a straight line indicative of constant speed for the gate over the distance considered in this example. On this plot, the velocity of the gate "V" at any time (within the distance resolution of the encoder 86/88) is indicated by distance traveled (Δd) divided by time (the interval for a $\tau_n$) to cover this distance (i.e., by Δd divided by $\tau_n$—the slope of the plotted line). Successive values for "$V_1$" and "$V_2$", for example, are the same, indicating the gate travels at constant speed.

Figure 12:
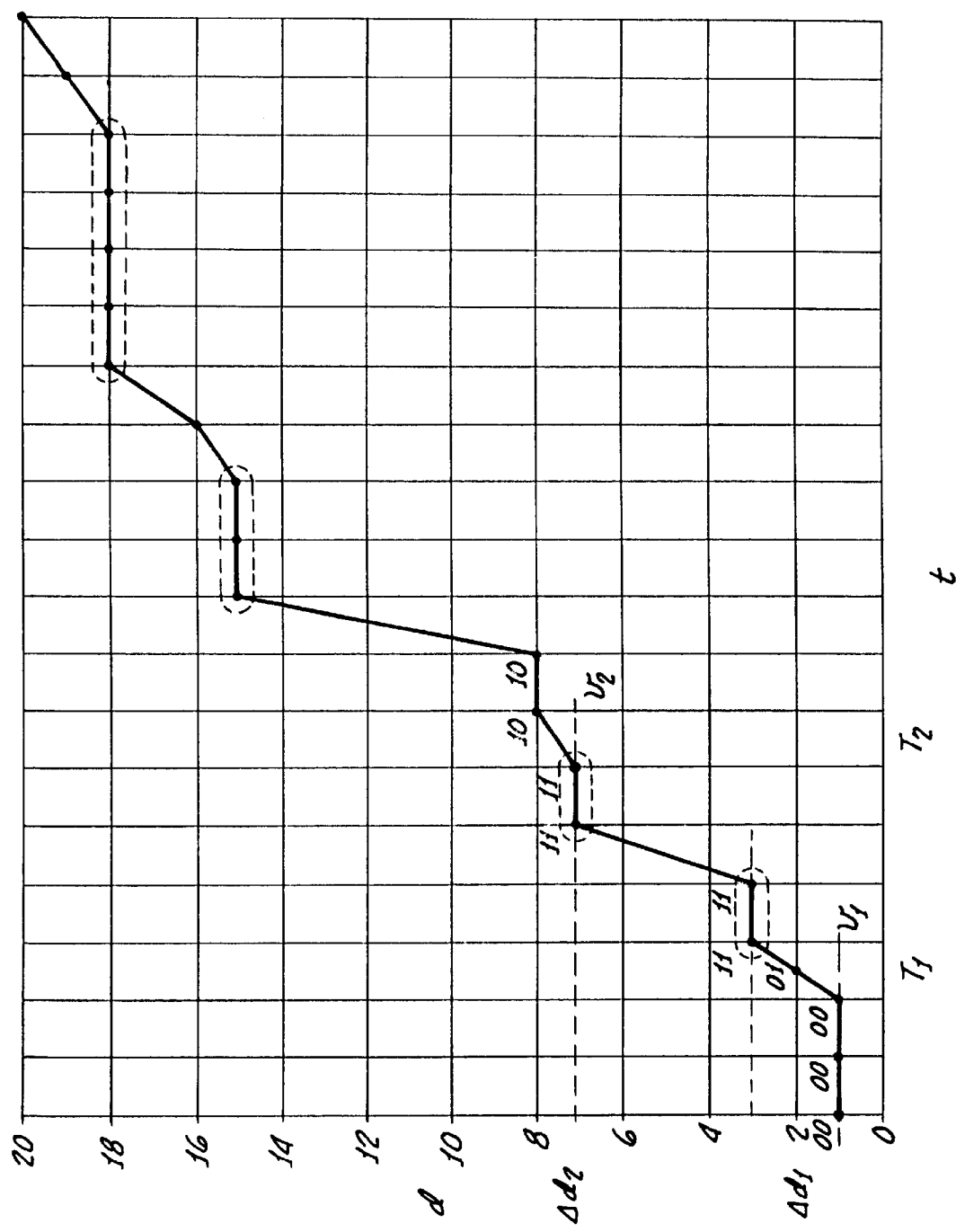

FIG. 12 provides an illustrative diagram of state points and gate position plotted also on the field of Δd divided by $\tau_n$. However, in this case, the speed of movement of the gate 12 varies, and is indicated by changes in the slope of the plotted line. Also, in several time intervals, indicated by dashed line encirclements on FIG. 12, the speed of the gate was either stopped, or slow enough that the resolution of the encoder reads it as stopped over the particular time intervals $\tau_n$.

Figure 13:
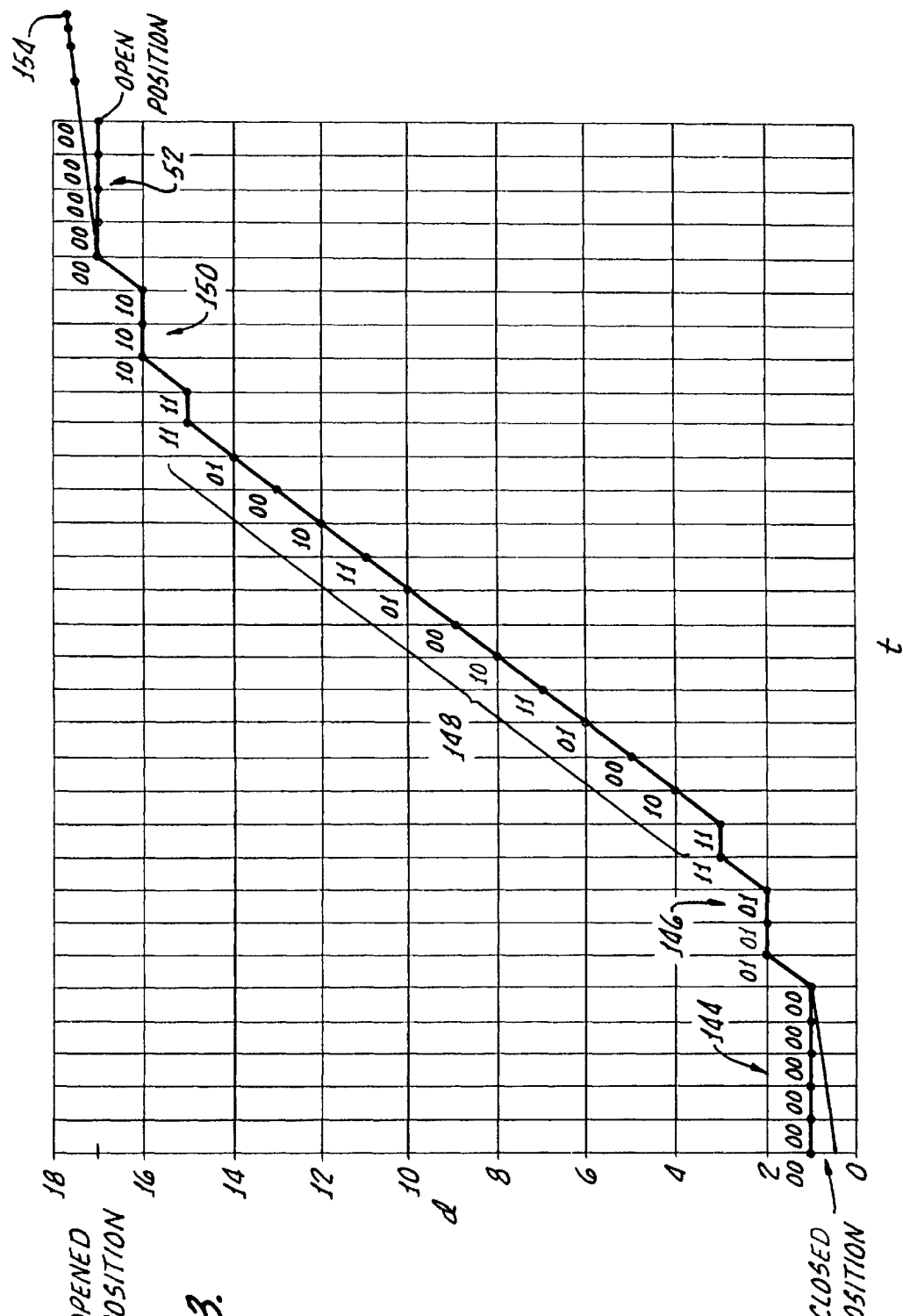

After understanding FIGS. 11 and 12, consideration of FIG. 13 will provide an understanding of an idealized owner-programmed opening or closing profile for the gate 12, which profile is also provided in the programming of the microprocessor 94 as one of the default profiles indicated on FIG. 8 as being available to the owner of a gate to select rather than using a leaning mode profile. As will be explained, in the event that the gate owner does not program the gate operator 10, then the operator will use this default profile shown in FIG. 13 to move the gate between its opened and closed positions. Alternatively, other default profile values may be provided in memory 96, with DIP switches being provided to allow the user to select from among the various default profiles for gate movement. The owner can override the default profiles at any time by providing a "learning mode" manual or powered operation of the gate, as will be further explained.

Viewing FIG. 13, if the owner manually moves the gate 12 in "learning mode" from one of the fully opened or fully closed positions to the other, and starts gate movement slowly in an increment 144, accelerates the gate in an increment 146 to a speed which is maintained at a constant level in increment 148, decelerates the gate in an increment 150, and eases the gate to the other of its fully opened or fully closed positions in an increment 152, the profile would appear generally as seen in FIG. 13. In FIG. 13, the starting position is presented as the fully closed position, so that the finishing position is the fully opened position. It will be understood that gate movement can be in the opposite direction as well. If this is a owner-selected profile for gate movement taught to the gate operator during a "learning mode" manual or powered movement of the gate 12, then the operator 10 will use this profile during movements of the gate in the same direction between its opened and closed positions until a different profile is programmed by the owner.

If however, the profile of FIG. 13 is the default profile, the operator 10 will initially not have a value of pulse count for the finishing position of the gate. Further, suppose that the finishing position for the particular gate and installation for which the operator 10 is providing powered operation of the gate is not reached until a position indicated at 154 off the right-hand margin of the graph of FIG. 13. In this case the gate will take quite a while to reach the finishing position because it is moving quite slowly over quite a distance. In such a case, the owner can select an alternative default profile using the DIP switches indicated at 100 of FIG. 6, or may choose to provide a leaning mode experience for the gate operator in order to accomplish a quicker movement of the gate between its fully opened and fully closed positions. A variety of gate movement default profiles may be provided in memory 96, with the owner being provided with documentation allowing a best choice from among these default profiles.

Figure 10:
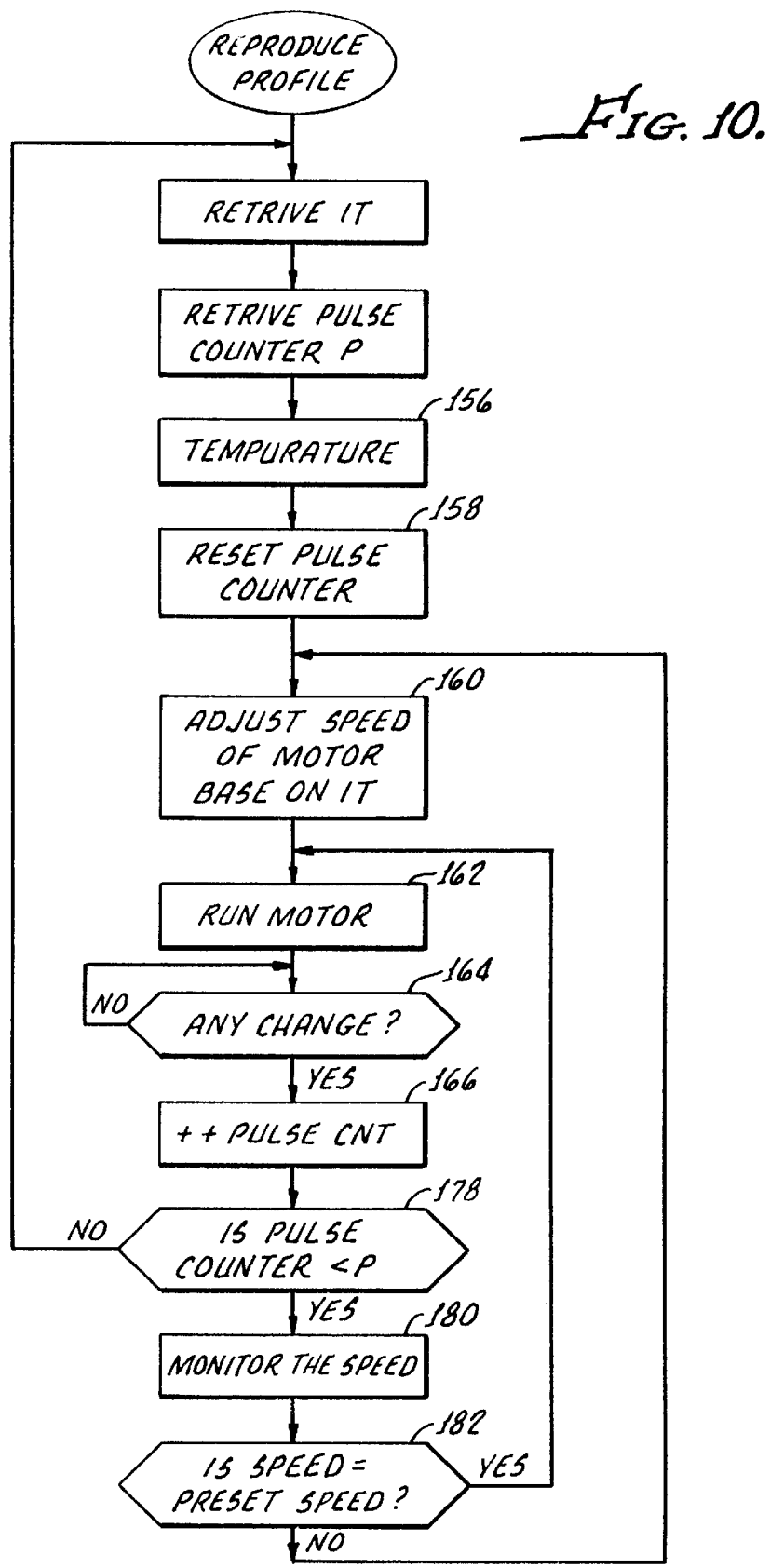

Considering now FIG. 8 at the sub-routine blocks 120 and 122, entitled "reproduce opening profile", and "reproduce closing profile", a consideration of FIG. 10 in combination with the graphical presentations of FIGS. 14–17 will explain how the operator 10 uses the recorded values of pulse count and the recorded sequence of values for $\tau_n$'s to effect gate movement replicating the accelerations, decelerations, and velocities applied manually or by power operation of the gate 12 by a human teacher during a "learning mode" movement of the gate. Dependent upon whether the gate 12 is to be moved in the opening or closing direction, recalling that profiles recorded at blocks 114*a* and 116*a* (i.e., the program-variable collection activities explained above) are utilized in order to replicate the opening or closing movement profiles for the gate 12, and that program subroutine block 120 uses the program variables recorded at 116*a*, while program subroutine block 122 uses the program variables recorded at 114*a*, it is seen that microprocessor 94 retrieves from memory 96 the values for I$\tau$ and P.

The value for P may be an actual number of pulses count, or may be an abridged value obtained by using a linear approximation across a portion of an acceleration or velocity profile for the gate movement, as will be explained. The use of such linear approximations smoothes out jerkiness of the gate movements which a human owner may have inadvertently produced during manual movement of the gate 12, and also simplifies the control of the gate movement. This smoothing function generally will not be noticeable to a human owner of the gate because gate inertia will smooth the gate movements anyway, as is further explained below.

At step 156, the microprocessor sets a temporary register to the value of P; and resets the pulse counter at step 158. Next, at step 160, the control circuit prepares an output command to motor controller 102 to operate the motor 52 in a direction to move the gate in the desired way (i.e., either opening or closing of the gate), and at a speed based on a first approximation of the speed necessary to move the gate "n" units of $\Delta$d (i.e., the total distance needed to move the gate between its opened and closed positions in the time I$\tau$. At step 162, the motor is actually run at this speed in the desired direction. Now, the control circuit 92 by operation of microprocessor at steps 164 and 166 begins watching for state changes produced by encoder 86/88, and increments the pulse counter each time a pulse is received.

Figure 14:
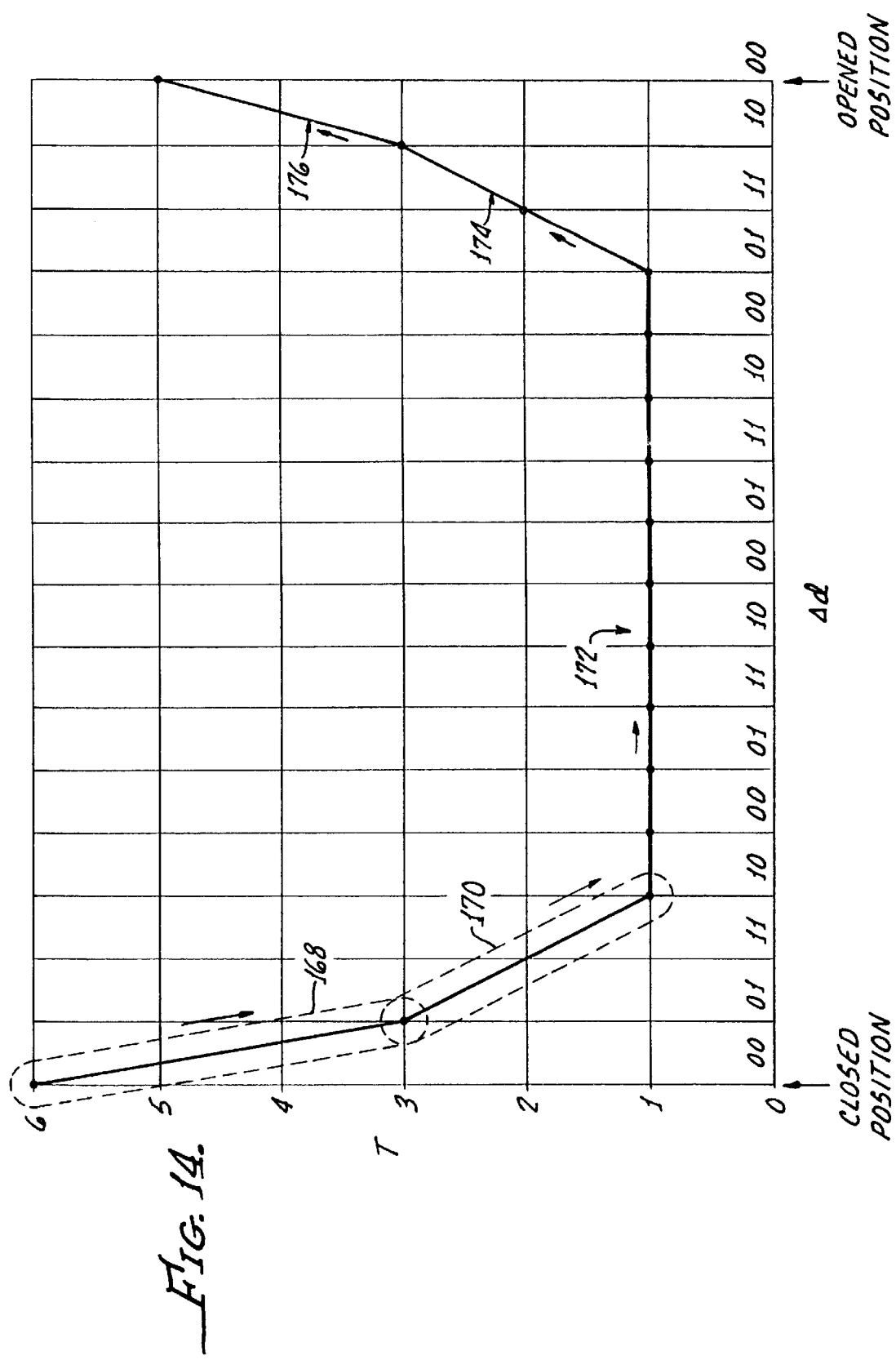
Figure 15:
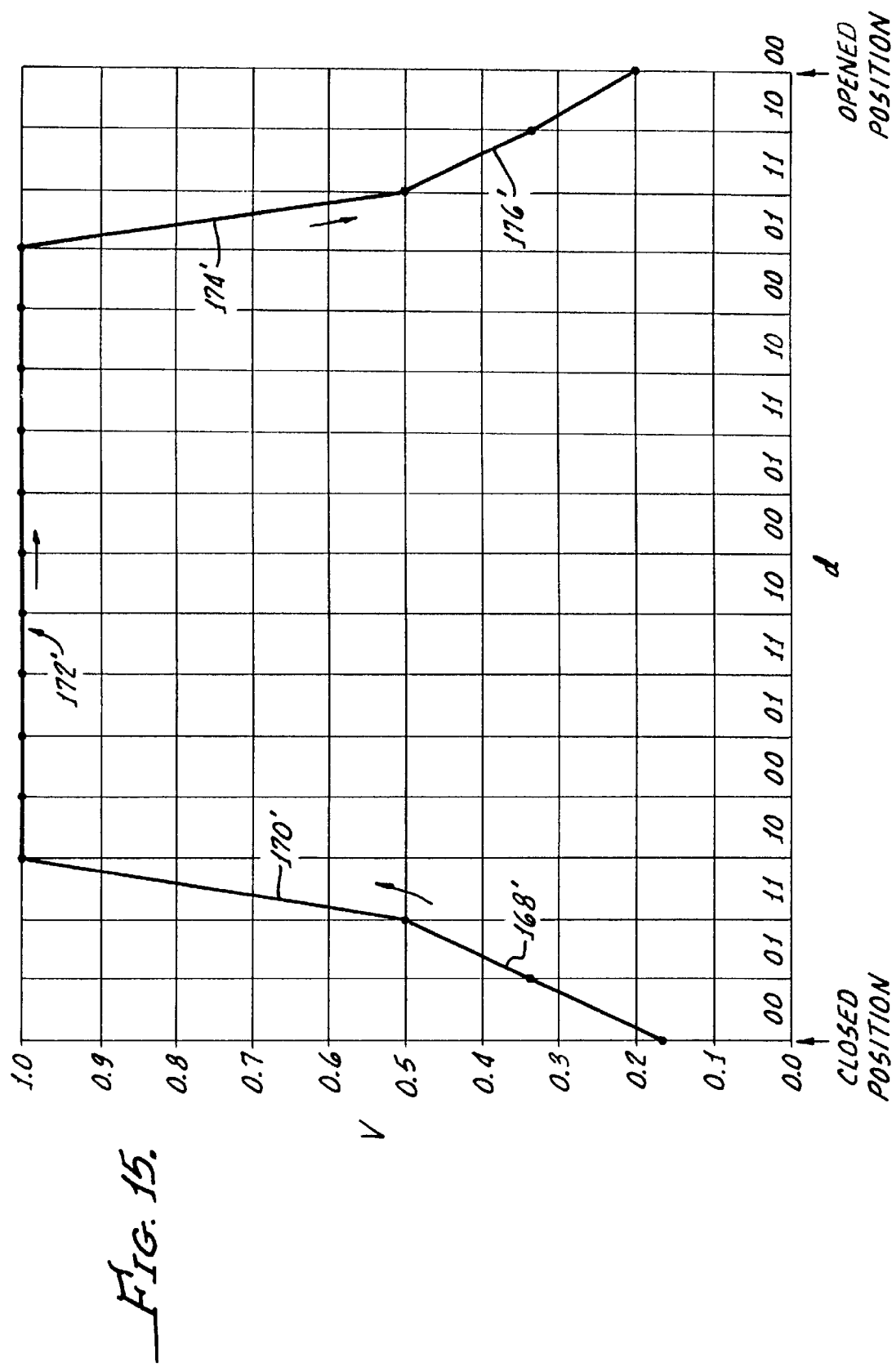

As FIG. 14 shows, the controller 92 is now operating in a domain of units of $\tau$ versus $\Delta$d, with actual displacements effected for the gate being measured by encoder 86/88 and appearing as pulses of the trains P1 and P2, and state changes of the diagram seen in FIG. 7*b*. At the left side of FIG. 14, the line segment 168 represents a displacement of 1$\Delta$d in a time period of 3$\tau$, so a slow acceleration of the gate is required. Line segment 170 represents a displacement of the gate 2$\Delta$d in a time interval of 2$\tau$, so a more rapid acceleration of the gate is required. In line segment 172, no acceleration of the gate is required. In line segments 174, and 176, the gate is decelerated to slow down and stop at its finished position (i.e., at the other of its fully opened or fully closed positions). Turning to FIG. 15, the resulting speed-versus-position profile for the gate as a result of the accelerations indicated on FIG. 14 is provided. The line segments are indicated using the same numeral used in FIG. 14, with a prime (') added.

As is seen in FIG. 10, the controller 92 at step 178 monitors the value in the pulse counter and compares this to the value of P stored in the temporary register (i.e., from step 156) over successive time periods, retrieving successive values of P from the date stored for the profile to be implemented, and at step 180 monitors the speed of the motor 52. At step 182 an iterative loop in implemented in which the motor speed is either determined to be within the set speed range to move the gate the required number of $\Delta$d's in a time interval, or the motor speed is adjusted (at step 160) to move it in the direction (either faster or slower) to achieve this match.

Figure 16:
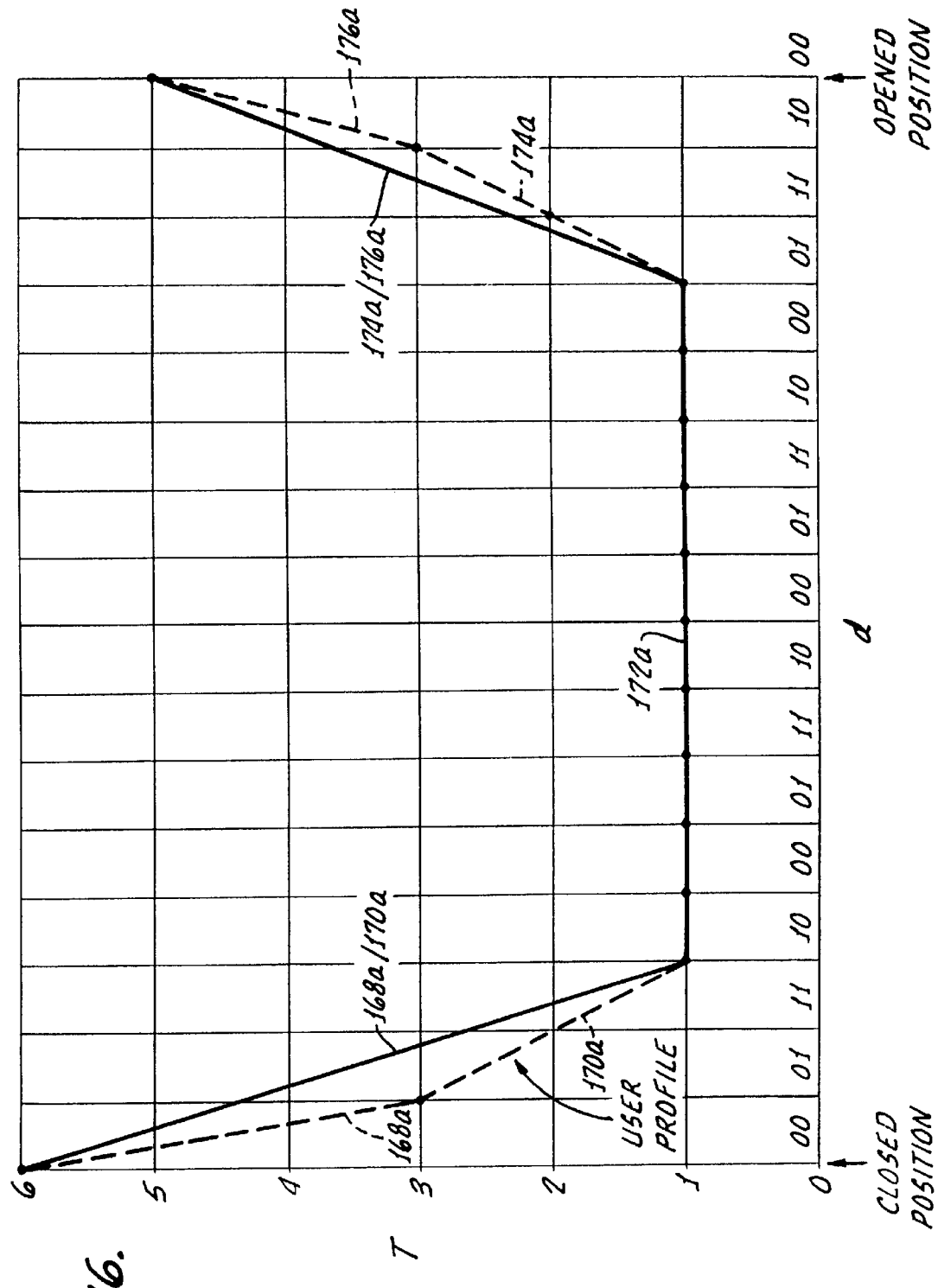
Figure 17:
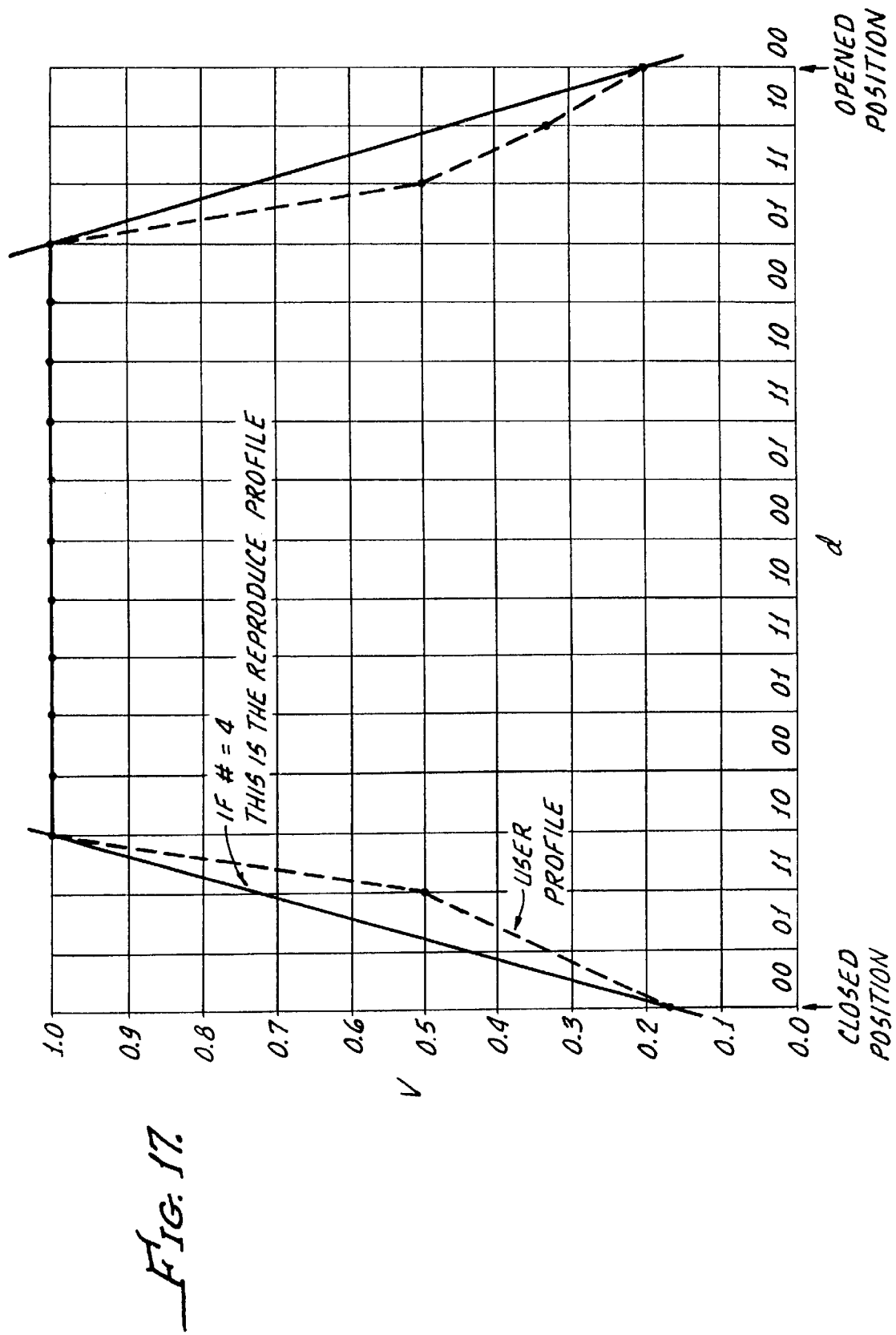

FIGS. 16 and 17 are similar to FIGS. 14 and 15, and use the same reference numerals used on the latter two Figures, but having a suffix "a" and "b" added, respectively. On FIG. 16, a simplifying linear approximation of an acceleration for the gate 12 is depicted at line segment 168*a*/170*a*. This line segment linearly bridges the accelerations indicated by line segments 168*a* and 170*a*. Similarly, the line segment 174*a*/176*a* linearly bridges the accelerations indicated by line segments 174*a* and 176*a*. In each case, the accelerations applied to the gate by a human teacher during a "learning mode" experience are not precisely replicated. However, the operation of the gate will in most instances be indistinguishable to the human, in part because gate inertia smooth the movement of the gate. Also, this linear approximation to bridge across accelerations has the effect of smoothing irregularities in the accelerations and velocities actually applied to the gate by a human teacher.

In other words, the human may think that they moved the gate smoothly during the learning mode experience, while in fact a jerkiness was taught to the gate because the human took a step or was momentarily off balance, for example, while manually moving the gate. Such unintended irregularities and jerkiness in the movement of the gate are smoothed out by allowing the microprocessor 94 to use a linear curve fitting to linearize some accelerations and velocities (see FIG. 17 for the resulting velocity profile). On the other hand, this curve fitting will not remove marked accelerations and velocities programmed in by the human teacher for purposes of easing the gate through a potential vehicle impact zone, for example.

In the description above, reference has been made to a powered operation of the gate 12 by operator 10 during a learning mode. Such powered operation of the gate during a leaning mode is an advantage with very large or heavy gates, for example, or for owners who are too frail to move the gate manually in the way that they would like to have it move, or for owners who simply don't want to have to manually move the gate in order to teach the operator 10 their preferred movement profile. Viewing FIG. 6 once again, it is seen that the control system 92 also includes as one of the input command devices of the group 100, a variable potentiometer, indicated with the numeral 100'. This potentiometer 100' is provided between a voltage source (i.e., provided from power supply 106) and ground potential in order to provide a controlled and variable voltage level into the microprocessor-based control circuit 92.

The physical configuration of the potentiometer 100' is not critical. This potentiometer could, for example, be a rotary or slide type, or could be configured as a "joy stick" form of potentiometer. Importantly, the control circuit 92 is programmed to interpret the level of the voltage signal from potentiometer 100' as a desired level of gate velocity selected by the user of the gate during a leaning mode. In order to provide a powered leaning mode operation of the gate, the owner places the gate operator 10 in leaning mode as described above, but in this case does not disconnect the driving connection between motor 52 and the gate 12. In other words, the embodiments of operator 10 with a disconnection handle 84, would have this handle in its solid line position of FIG. 1a during a leaning mode powered operation of the gate 12. Then the owner uses the potentiometer to command gate movements in the directions and at the desired velocities chosen by the owner, with accelerations being provided as indicated by the rate of incremental change of voltage level from the potentiometer 100' within the ability of the operator 10 to accelerate the particular gate involved. When the leaning mode experience is complete, the owner take the control circuit 92 out of leaning mode, and the gate profile taught to the operator 10 during this experience will be used thereafter by the operator 10, in the same way as a profile taught to it manually.

While the present invention has been depicted, described, and is defined by reference to several particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

I claim:

1. A method of power-operating a gate member movable between opened and closed positions, the method comprising steps of:
    manually moving a gate member between its opened and closed positions at selected accelerations and velocities;
    recording a gate movement profile of the selected accelerations and velocities during the manual movement of the gate; and
    power driving the gate member between its opened and closed positions to replicate the gate movement profile.

2. The method of claim 1 further including the steps of providing an electric motor; and using the electric motor to power drive the gate member.

3. The method of claim 2 further including the step of coupling the electric motor to the gate member via a power train having a movable output member.

4. The method of claim 3 further including the steps of providing in said power train a back-drivable portion in power transmission series connection with a no-back portion which is not back-drivable; providing a releasable clutch device between the back-drivable portion and the no-back portion; and releasing the clutch to allow the gate member to be manually moved between its opened and closed positions.

5. The method of claim 4 including the further step of disposing the back-drivable portion in operative association with the gate member, and interposing said back-drivable portion between the gate member and the releasable clutch in the power train.

6. The method of claim 5 including the further step of disposing the no-back portion in operative association with the electric motor, and interposed said no-back portion between the releasable clutch and the electric motor in the power train.

7. The method of claim 1 further including the step of using a microprocessor to record the gate movement profile during the manual movement of the gate.

8. The method of claim 7 further including the steps of providing an electric motor; and using the electric motor to power drive the gate member; coupling the electric motor to the gate member via a power train having a movable output member; providing a microprocessor-based control system including the microprocessor and a memory facility, storing the gate movement profile in the memory facility; and providing an encoder drivingly associated with said output member and providing a signal indicative of movement of said gate member to said microprocessor.

9. The method of claim 8 wherein said step of
    power driving the gate member between its opened and closed positions to replicate the gate movement profile includes steps of:
        using the microprocessor to retrieve from said memory facility said gate movement profile;
        using said microprocessor to control operation of said electric motor to power drive the gate member between said opened closed positions; and
        using said microprocessor to compare the signal from said encoder during power driving of said gate member, and to adjust the speed of operation of said motor to replicate the gate movement profile.

10. A powered gate operator for moving a gate, and allowing a human by manual movement of the gate to teach the gate operator a preferred gate movement profile; thereafter the gate operator replicating the preferred gate movement profile by powered movement of the gate, said gate operator comprising:
    a variable-speed electric motor;
    a speed reduction power train coupling said electric motor to a movable output member, which output member may be coupled to the gate to effect movement of the gate;
    an encoder drivingly associated with said output member for providing a signal indicative of the extent of movement of said output member, so that said signal is indicative also of the extent of movement of the gate;
    a microprocessor-based control system including a time keeping facility and a memory facility and receiving said signal, said control system including programming for recording in said memory facility values indicative of said gate movement profile during manual movement of the gate, the microprocessor-based control system also including programming for retrieving said values from said memory facility during powered movement of the gate by said gate operator and for controlling the speed of the variable-speed motor according to said values to replicate the gate movement profile.

11. The powered gate operator according to claim 10 further including a releasable clutch interposed in said power train and allowing manual movement of said output member when said clutch is released, thus allowing a gate coupled to said output member also to be manually moved.

12. The powered gate operator according to claim 10 wherein said drive train further includes a back-drivable portion in power transmission series connection with a no-back portion which is not back-drivable; said releasable clutch being interposed between the back-drivable portion and the no-back portion.

13. The powered gate operator according to claim 12 wherein said back-drivable portion is interposed between said releasable clutch and said output member in said power train.

14. The powered gate operator according to claim 12 wherein said no-back portion is interposed between said releasable clutch and said electric motor in said power train.

15. A powered gate operator for a swinging gate having opened and closed positions with respect to a gateway, said gate operator comprising:

an elongate housing having provision near one end thereof for mounting the gate operator to a stationary support bracket at the gate opening, an output member moving lengthwise of said housing responsive to operation of the gate operator, said output member having provision to mount to a bracket on the gate to move the gate between opened and closed positions in response to movement of the output member between respective first and second positions along the length of the housing;

a variable-speed electric motor mounted in said housing;

a speed reduction power train mounted in said housing and drivingly coupling said electric motor to said output member to move the output member between said first and second positions along the length of the housing;

an encoder drivingly associated with said output member for providing a signal indicative of the extent of movement of said output member, so that said signal is indicative also of the extent of movement of the gate;

a programmable-logic unit control system including a time keeping facility and a memory facility and receiving said signal, said control system including programming for:

recording in said memory facility values indicative of said gate movement profile during manual movement of the gate, for retrieving said values from said memory facility during powered movement of the gate by said gate operator, and for controlling the speed of the variable-speed motor according to said values to replicate the gate movement profile.

16. The powered gate operator according to claim 15 further including a jack screw member extending along the length of said housing, said jack screw member having a thread portion, and a nut member threadably carried on said thread portion and drivingly associated with said output member, said jack screw member thread portion and said nut member being back drivable in response to manual application of axial force to said output member to rotate said jack screw member, said power train including a no-back portion, a releasable clutch interposed in said power train between said jack screw member and said no-back portion and allowing manual movement of said output member when said clutch is released.

17. The powered gate operator according to claim 16 wherein said no-back portion includes a worm-gear drive having a worm member power driven by said electric motor and a worm wheel drivingly connecting to said jack screw member; said releasable clutch being interposed between the worm wheel and the jack screw member.

18. The powered gate operator according to claim 15 further including a jack screw member extending along the length of said housing, said jack screw member having a thread portion, and a nut member threadably carried on said thread portion and drivingly associated with said output member, said encoder being drivingly associated with said jack screw member to that movement of said output member rotating said jack screw member provides said signal indicative of the extent of movement of said output member.

19. A method of power-operating a gate member movable between opened and closed positions according to a selected profile of gate accelerations and velocities, the method comprising steps of:

power driving a movable gate member between its opened and closed positions at selected accelerations and velocities;

utilizing a manual control input device to select said accelerations and velocities during said power driving of the gate;

recording a gate movement profile of the selected accelerations and velocities during the movement of the gate; and power driving the gate member between its opened and closed positions to replicate the recorded gate movement profile.

20. A powered gate operator for moving a gate, and allowing a human by manual movement of the gate or by manual control of powered movement of the gate during a leaning mode to teach the gate operator a preferred gate movement profile of gate accelerations and velocities; thereafter the gate operator replicating the preferred gate movement profile by powered movement of the gate, said gate operator comprising:

a variable-speed drive apparatus coupled to the gate for moving the gate between opened and closed positions;

an encoder drivingly coupled with said gate for providing a signal indicative of the extent of movement of said gate;

a microprocessor-based control system including a time keeping facility and a memory facility and receiving said signal, said control system including programming for recording in said memory facility values indicative of said gate movement profile during manual movement of the gate, the microprocessor-based control system also including programming for retrieving said values from said memory facility during powered movement of the gate by said gate operator and for controlling the speed of the variable-speed motor according to said values to replicate the gate movement profile.

21. The powered gate operator according to claim 20 further including said microprocessor including programming for interpreting a voltage level received from a manual input control device as a desired level of velocity for said gate, and effecting movement of the gate according to desired level of velocity during a leaning mode experience.

* * * * *